(12) United States Patent
Saisho et al.

(10) Patent No.: US 8,848,013 B2
(45) Date of Patent: Sep. 30, 2014

(54) OPTICAL SCANNING DEVICE AND IMAGE FORMING APPARATUS INCLUDING A PLURALITY OF SCANNED MEMBERS

(75) Inventors: Kenichiroh Saisho, Tokyo (JP); Toshiaki Tokita, Kanagawa (JP); Nobuaki Kubo, Tokyo (JP); Seizo Suzuki, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 14 days.

(21) Appl. No.: 13/169,942

(22) Filed: Jun. 27, 2011

(65) Prior Publication Data
US 2011/0316959 A1 Dec. 29, 2011

(30) Foreign Application Priority Data

Jun. 25, 2010 (JP) ................................ 2010-144506
Feb. 25, 2011 (JP) ................................ 2011-039167

(51) Int. Cl.
*B41J 15/14* (2006.01)
*B41J 27/00* (2006.01)
*G02B 26/12* (2006.01)
*B41J 2/47* (2006.01)
*G02B 27/28* (2006.01)

(52) U.S. Cl.
CPC .............. *G02B 26/123* (2013.01); *B41J 2/473* (2013.01); *G02B 27/283* (2013.01); *G02B 26/124* (2013.01)
USPC .......................................... 347/241; 347/256

(58) Field of Classification Search
USPC ........................... 347/231, 241–245, 256–261
See application file for complete search history.

(56) References Cited

U.S. PATENT DOCUMENTS

| 5,691,761 | A | * | 11/1997 | Fisli .............................. 347/241 |
| 5,757,413 | A | * | 5/1998 | Andrews ........................ 347/256 |
| 6,088,146 | A | * | 7/2000 | Takeshita et al. ........... 359/204.1 |
| 7,045,773 | B2 | | 5/2006 | Suzuki et al. |
| 7,167,288 | B2 | | 1/2007 | Miyatake et al. |

(Continued)

FOREIGN PATENT DOCUMENTS

| JP | 10-186225 A | 7/1998 |
| JP | 2004-184591 | 7/2004 |

(Continued)

OTHER PUBLICATIONS

U.S. Appl. No. 13/053,762, filed Mar. 22, 2011, Saisho, et al.

(Continued)

*Primary Examiner* — Hai C Pham
(74) *Attorney, Agent, or Firm* — Oblon, Spivak, McClelland, Maier & Neustadt, L.L.P.

(57) ABSTRACT

An optical scanning device, arranged on one side of at least two to-be-scanned members in a second direction, and the two to-be-scanned members being arranged in a first direction perpendicular to the second, includes: an illuminating system that emits beams including a first beam and a second beam whose polarization directions are different from each other; an optical deflector that deflects the beams; and a scanning optical system that includes a polarization separation element that transmits one of the first and second beams and reflects the other; a first mirror group including reflecting mirrors for guiding the first beam to a to-be-scanned member; and a second mirror group including reflecting mirrors for guiding the second beam to a to-be-scanned member. Last-stage reflecting mirrors in the first and second mirror groups are arranged on one side of the beams deflected by the optical deflector in the second direction.

9 Claims, 24 Drawing Sheets

(56) References Cited

U.S. PATENT DOCUMENTS

| | | |
|---|---|---|
| 7,245,430 B2 | 7/2007 | Kobayashi et al. |
| 7,277,212 B2 | 10/2007 | Miyatake et al. |
| 7,403,316 B2 | 7/2008 | Amada |
| 7,411,712 B2 * | 8/2008 | Nakajima et al. ........... 359/204.1 |
| 7,417,777 B2 | 8/2008 | Saisho et al. |
| 7,427,999 B2 * | 9/2008 | Nakatsu ........................ 347/232 |
| 7,450,274 B2 | 11/2008 | Itabashi et al. |
| 7,545,547 B2 | 6/2009 | Hayashi et al. |
| 7,616,364 B2 | 11/2009 | Saisho et al. |
| 7,663,657 B2 | 2/2010 | Ichii et al. |
| 7,672,032 B2 | 3/2010 | Hayashi et al. |
| 7,688,491 B2 | 3/2010 | Saisho et al. |
| 7,710,445 B2 | 5/2010 | Amada et al. |
| 7,760,223 B2 | 7/2010 | Suzuki et al. |
| 7,764,301 B2 | 7/2010 | Suzuki et al. |
| 7,800,641 B2 | 9/2010 | Kubo et al. |
| 7,817,177 B2 | 10/2010 | Hayashi et al. |
| 7,876,486 B2 | 1/2011 | Saisho et al. |
| 7,889,224 B2 | 2/2011 | Hagiya et al. |
| 7,903,135 B2 | 3/2011 | Ichii et al. |
| 7,986,334 B2 * | 7/2011 | Bannai et al. ................. 347/239 |
| 8,351,118 B2 * | 1/2013 | Tokita et al. .............. 359/485.05 |
| 2007/0216316 A1 | 9/2007 | Hirano et al. |
| 2007/0253048 A1 | 11/2007 | Sakai et al. |
| 2008/0019255 A1 | 1/2008 | Imai et al. |
| 2008/0123159 A1 | 5/2008 | Hayashi et al. |
| 2008/0204852 A1 | 8/2008 | Amada et al. |
| 2008/0218827 A1 | 9/2008 | Watanabe et al. |
| 2008/0219601 A1 | 9/2008 | Arai et al. |
| 2009/0058979 A1 | 3/2009 | Saisho et al. |
| 2009/0059337 A1 | 3/2009 | Saisho |
| 2009/0074437 A1 | 3/2009 | Tanabe et al. |
| 2009/0175657 A1 | 7/2009 | Yoshii et al. |
| 2009/0195636 A1 | 8/2009 | Arai et al. |
| 2009/0220256 A1 | 9/2009 | Suhara et al. |
| 2009/0231557 A1 | 9/2009 | Kubo |
| 2010/0014892 A1 | 1/2010 | Shimomura |
| 2010/0060710 A1 | 3/2010 | Kubo |
| 2010/0060963 A1 | 3/2010 | Miyake et al. |
| 2010/0118366 A1 | 5/2010 | Tokita et al. |
| 2010/0183337 A1 | 7/2010 | Kubo et al. |
| 2010/0328417 A1 * | 12/2010 | Saisho et al. .................. 347/243 |
| 2011/0002025 A1 | 1/2011 | Tokita et al. |

FOREIGN PATENT DOCUMENTS

| | | | |
|---|---|---|---|
| JP | 2004184591 A * | 7/2004 | ............. G02B 26/10 |
| JP | 2004-333994 A | 11/2004 | |
| JP | 2006-30912 A | 2/2006 | |
| JP | 2006-267398 | 10/2006 | |
| JP | 2007-293182 A | 11/2007 | |
| JP | 2008-015140 | 1/2008 | |
| JP | 2008-76712 A | 4/2008 | |
| JP | 2008-145939 A | 6/2008 | |
| JP | 2010-026055 | 2/2010 | |
| JP | 2010-134244 A | 6/2010 | |
| JP | 2011-033897 | 2/2011 | |

OTHER PUBLICATIONS

U.S. Appl. No. 13/152,989, filed Jun. 3, 2011, Sakai, et al.

Office Action issued Jul. 22, 2014 in Japanese Patent Application No. 2011-039167.

* cited by examiner

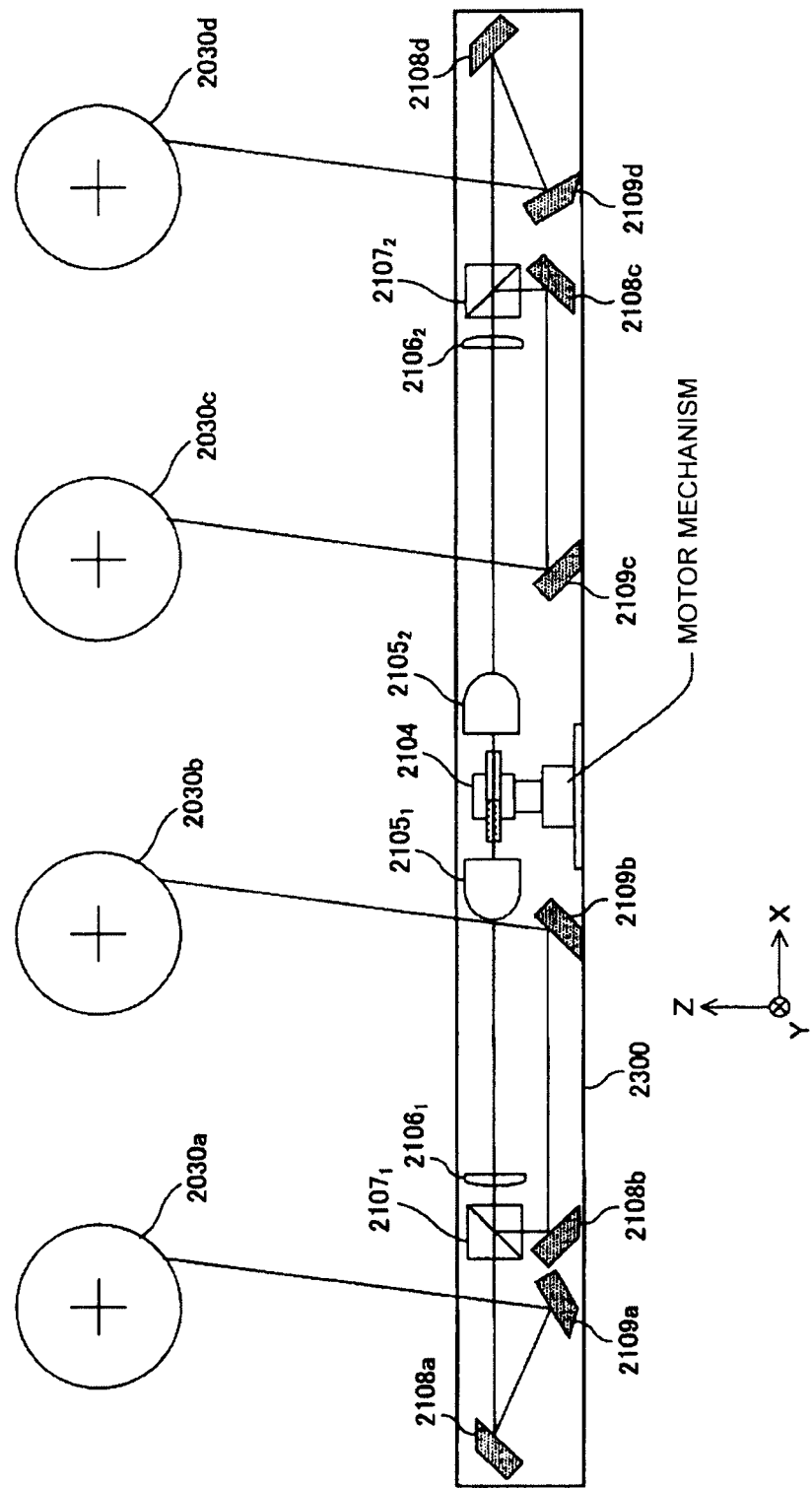

EDGE-EMITTING ELEMENT
ACTIVE LAYER
POLARIZATION DIRECTION

INCIDENT BEAM

POLARIZATION SEPARATION SURFACE

INCIDENT BEAM

POLARIZATION SEPARATION SURFACE

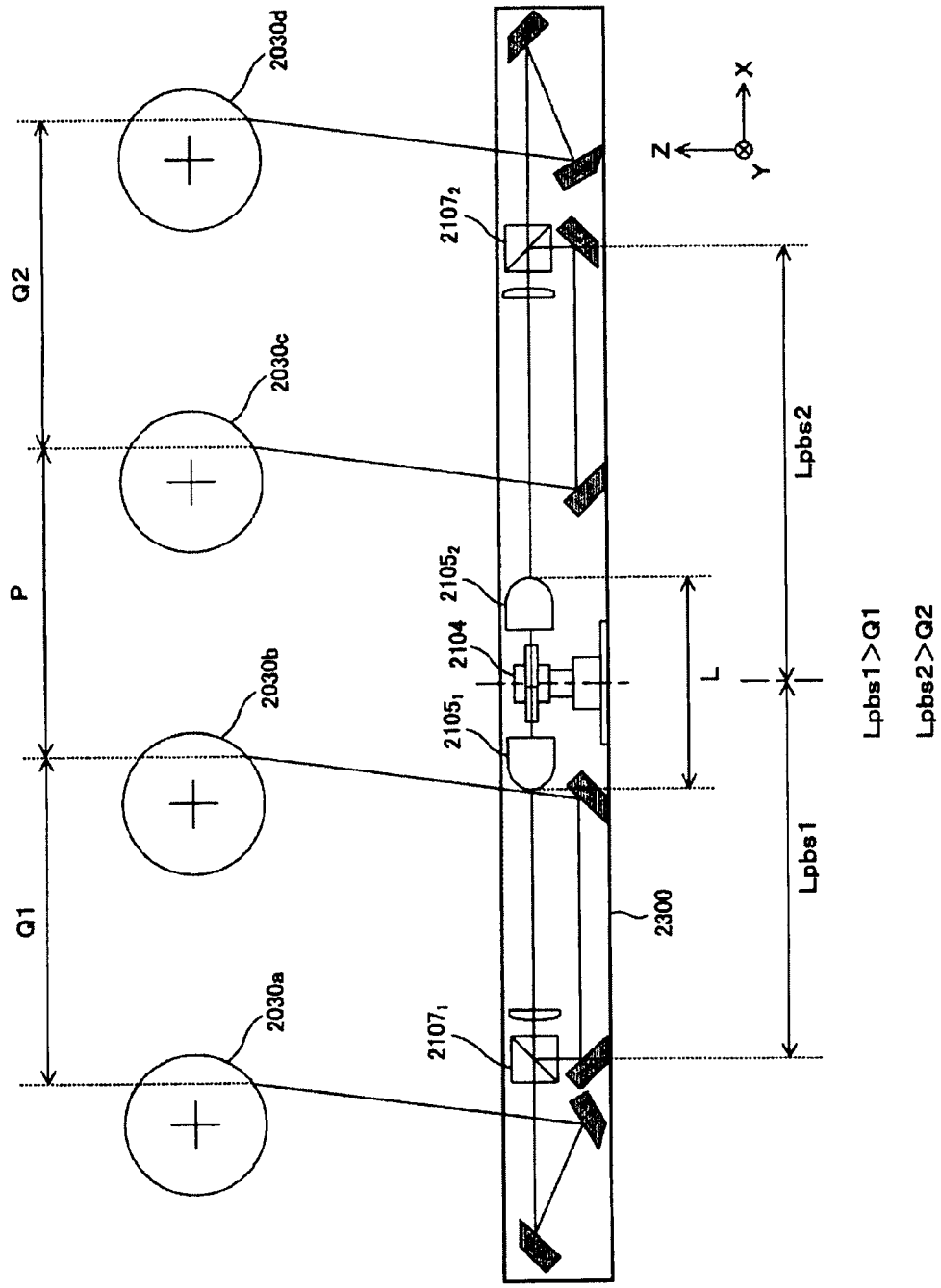

FIG.21

UNIT: mm (EXCLUDING REFRACTIVE INDEX)

| | Ry | Rz(0) | X-COOR-DINATE | Y-COOR-DINATE | Z-COOR-DINATE | REFRAC-TIVE INDEX |
|---|---|---|---|---|---|---|
| REFLECTING SURFACE OF POLYGON MIRROR | ∞ | ∞ | 7.07 | 7.07 | 0 | 1 |
| DEFLECTOR-SIDE SCANNING LENS 2105₂ — INCIDENCE SURFACE | -73.62 | -73.62 | 14.77 | 7.07 | 0 | 1.511 (GLASS) |
| DEFLECTOR-SIDE SCANNING LENS 2105₂ — EMISSION SURFACE | -48.84 | -48.84 | 39.77 | 7.07 | 0 | 1 |
| IMAGE-PLANE-SIDE SCANNING LENS 2106₂ — INCIDENCE SURFACE | 1518.40 | -700.7 | 103.77 | 7.07 | 0 | 1.524 (RESIN) |
| IMAGE-PLANE-SIDE SCANNING LENS 2106₂ — EMISSION SURFACE | 1414.43 | -31.57 | 108.77 | 7.07 | 0 | 1 |
| REFLECTING SURFACE OF POLARIZATION SPLITTING ELEMENT 2107₂ | ∞ | ∞ | 118.47 | 7.07 | 0 | — |
| REFLECTING MIRROR 2108c | ∞ | ∞ | 118.47 | 7.07 | -10 | 1 |
| REFLECTING MIRROR 2109c | ∞ | ∞ | 48.47 | 7.07 | -10 | 1 |
| IMAGING POSITION ON PHOTOSENSITIVE DRUM 2030c | — | — | 48.47 | 7.07 | 69.3 | — |

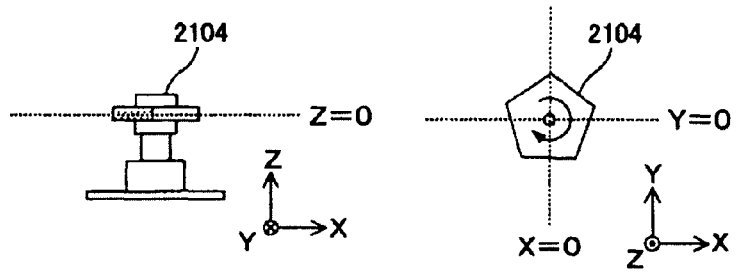

FIG.22

| | EMISSION-SIDE SURFACE | INCIDENCE-SIDE SURFACE |
|---|---|---|
| K | $-8.63 \times 10^2$ | $2.06 \times 10$ |
| $A_1$ | 0 | 0 |
| $A_2$ | 0 | 0 |
| $A_3$ | 0 | 0 |
| $A_4$ | $-4.09 \times 10^{-7}$ | $-5.05 \times 10^{-7}$ |
| $A_5$ | 0 | 0 |
| $A_6$ | $7.34 \times 10^{-11}$ | $7.74 \times 10^{-11}$ |
| $A_7$ | 0 | 0 |
| $A_8$ | $-1.61 \times 10^{-16}$ | $-4.67 \times 10^{-15}$ |
| $A_9$ | 0 | 0 |
| $A_{10}$ | $-4.35 \times 10^{-19}$ | $6.57 \times 10^{-19}$ |
| $A_{11}$ | 0 | 0 |
| $A_{12}$ | $-1.68 \times 10^{-23}$ | $-9.06 \times 10^{-23}$ |
| $B_1$ | - | $-4.43 \times 10^{-6}$ |
| $B_2$ | $-1.60 \times 10^{-6}$ | $1.29 \times 10^{-6}$ |
| $B_3$ | - | $-2.36 \times 10^{-9}$ |
| $B_4$ | $4.37 \times 10^{-10}$ | $-4.17 \times 10^{-10}$ |
| $B_5$ | - | $2.81 \times 10^{-12}$ |
| $B_6$ | - | $1.06 \times 10^{-13}$ |
| $B_7$ | - | $-1.07 \times 10^{-15}$ |
| $B_8$ | - | $1.49 \times 10^{-17}$ |
| $B_9$ | - | - |
| $B_{10}$ | - | - |
| $B_{11}$ | - | - |
| $B_{12}$ | - | - |

OPTICAL SCANNING DEVICE AND IMAGE FORMING APPARATUS INCLUDING A PLURALITY OF SCANNED MEMBERS

CROSS-REFERENCE TO RELATED APPLICATIONS

The present application claims priority to and incorporates by reference the entire contents of Japanese Patent Application No. 2010-144506 filed in Japan on Jun. 25, 2010 and Japanese Patent Application No. 2011-039167 filed in Japan on Feb. 25, 2011.

BACKGROUND OF THE INVENTION

1. Field of the Invention

The present invention relates to an optical scanning device and an image forming apparatus. More specifically, the present invention relates to an optical scanning device that scans a scanning surface with a light beam and an image forming apparatus including the optical scanning device.

2. Description of the Related Art

Optical scanning devices have been widely known in connection with image forming apparatuses, such as optical printers, digital copiers, and optical plotters. With spread of the image forming apparatuses, a demand is increasing for high stability, high definition, and high speed as well as reduction in the number of components and downsizing of the apparatuses.

In recent years, multicolor image forming apparatuses that superimpose a plurality of color images have been developed. In particular, a tandem system, in which a plurality of scanning optical systems forms optical spots on respective photosensitive elements for different colors, is increasingly used to configure the multicolor image forming apparatuses.

To perform writing of multicolor images, a method has been employed in which optical scanning devices are provided for respective colors. In this method, however, there is a problem in that the number of components increases because of provision of optical components for each color; and downsizing becomes difficult because of mounting of a plurality of optical scanning devices inside an image forming apparatus.

Therefore, a system using a single optical scanning device that houses a plurality of scanning optical systems has been proposed. With this system, in general, a plurality of light beams for respective colors enters a single optical deflector, and each light beam is focused onto a corresponding photosensitive drum by each scanning optical system (see FIG. 32).

However, with this system, optical elements for respective colors are closely arranged around the optical deflector, so that downsizing of the optical scanning device becomes limited.

To overcome the limitations on the downsizing of optical scanning devices that handle multiple colors, various methods have been proposed.

For example, there is a known method in which polarization directions of light beams are made different. Two scanning optical systems that are arranged so as to overlap in the vertical direction are integrated. The light beams are split by polarized-beam splitting elements (polarization separation elements) arranged inside the scanning optical systems. Each light beam is guided to a corresponding photosensitive element. Hereinafter, this method is referred to as a "polarization separation system".

This method is advantageous to reduce the size of an optical scanning device in a direction along the rotation axis of an optical deflector (to make the optical scanning device thin), and to reduce the number of components by sharing optical elements on upper and lower stages in the scanning optical systems.

Other known methods include a method of integrating scanning optical systems by using a dynamic active element, such as a spatial modulation element; a method of splitting a light beam by using a dichroic mirror and light sources with different wavelengths; and a method of causing light beams for all colors to be obliquely incident on a single optical deflector (see Japanese Patent Application Laid-open No. 2004-184591, Japanese Patent Application Laid-open No. 2006-267398, Japanese Patent Application Laid-open No. 2010-26055, and Japanese Patent Application Laid-open No. 2008-15140).

However, when an active element is used, a drive circuit for the active element is needed. When a dichroic mirror is used, different types of light sources are mounted on a single optical scanning device. Therefore, even though the number of optical elements of a scanning optical system is reduced, it is necessary to increase more expensive elements to compensate for the reduction of the optical elements. When a light beam is obliquely incident, optical performance is reduced due to the oblique incidence on an optical deflector and a scanning lens.

To overcome the limitations on the downsizing of optical scanning devices that handle multiple colors, the polarization separation system described above is desirable.

However, with the conventional polarization separation system, it is necessary to ensure a sufficient optical path length in accordance with a write width in order to suppress reduction in optical performance. However, if the optical path length is too long, the layout of the optical path in the optical scanning device becomes limited. Furthermore, when apparatuses are further downsized, optical elements may interfere with each other.

SUMMARY OF THE INVENTION

It is an object of the present invention to at least partially solve the problems in the conventional technology.

According to an aspect of an invention, there is provided an optical scanning device that is arranged on one side of at least two to-be-scanned members in a second direction, the two to-be-scanned members being arranged in a first direction, and the second direction being perpendicular to the first direction along which the to-be-scanned members are arranged, and that separately performs optical scanning on surfaces of the to-be-scanned members in a main-scanning direction that is perpendicular to both of the first direction and the second direction, the optical scanning device including: an illuminating system that emits a plurality of beams including a first beam and a second beam, wherein polarization directions of the first beam and the second beam are different from each other; an optical deflector that deflects the beams from the illuminating system; and a scanning optical system that includes a polarization separation element that transmits one of the first beam and the second beam that are deflected by the optical deflector and reflects the other one of the first beam and the second beam that are deflected by the optical deflector; a first mirror group including a plurality of reflecting mirrors for guiding the first beam, which comes from the polarization separation element, to a corresponding to-be-scanned member; and a second mirror group including a plurality of reflecting mirrors for guiding the second beam, which comes from the polarization separation element, to a corresponding to-be-scanned member, wherein a last-stage reflecting mirror in the first mirror group and a last-stage reflecting mirror in the second mirror group are arranged on one side of the beams, which have been deflected by the optical deflector, in the second direction.

According to another aspect of the present invention, there is provided an image forming apparatus including: a plurality of image carriers; and the optical scanning device according to claim 1, the optical scanning device configured to optically scan the image carriers with a beam modulated based on image information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is another diagram of the schematic configuration of the optical scanning device illustrated in FIG. 1;

FIG. 20 is a diagram explaining a relation of an interval between imaging positions of photosensitive drums and a distance between the center of rotation of the polygon mirror to the polarization separation surface of the polarization separation element;

FIG. 21 is a diagram explaining an example of design values of an optical system;

FIG. 22 is a diagram explaining the shape of an image-plane-side scanning lens;

DETAILED DESCRIPTION OF THE PREFERRED EMBODIMENTS

Figure 1:
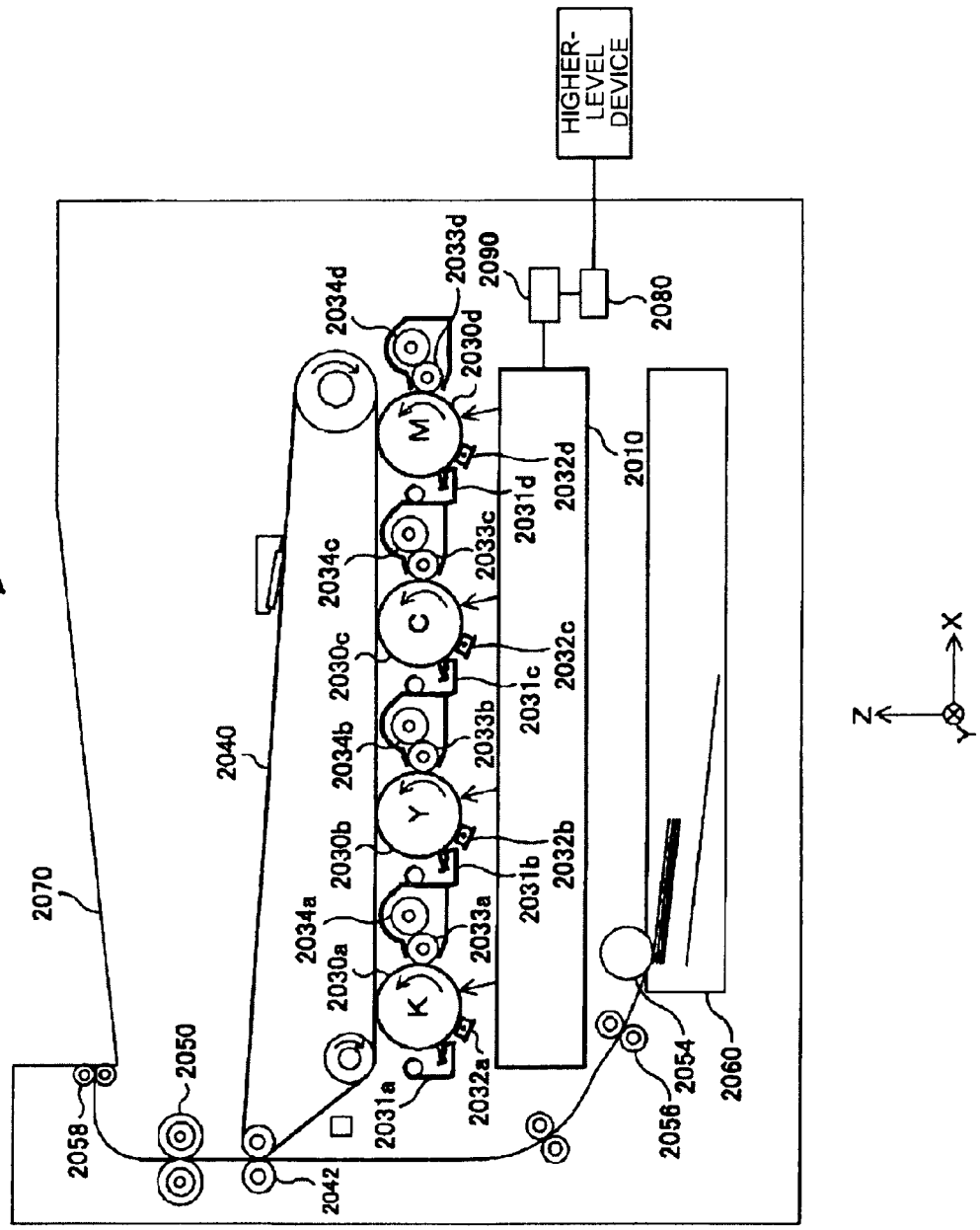
FIG. 1 is a diagram explaining a schematic configuration of a color printer according to an embodiment of the present invention.

Exemplary embodiments of the present invention will be explained in detail below with reference to the accompanying drawings FIGS. 1 to 23. FIG. 1 is a diagram illustrating a schematic configuration of a color printer 2000 according to an embodiment of the present invention.

The color printer 2000 is a tandem multicolor printer that forms a full-color image by superimposing four colors (black, cyan, magenta, and yellow). The color printer 2000 includes an optical scanning device 2010, four photosensitive drums (2030a, 2030b, 2030c, and 2030d), four cleaning units (2031a, 2031b, 2031c, and 2031d), four charging units (2032a, 2032b, 2032c, and 2032d), four developing rollers (2033a, 2033b, 2033c, and 2033d), four toner cartridges (2034a, 2034b, 2034c, and 2034d), a transfer belt 2040, a transfer roller 2042, a fixing roller 2050, a feed roller 2054, a registration roller pair 2056, a discharging roller 2058, a feed tray 2060, a discharge tray 2070, a communication control device 2080, and a printer control device 2090 that integrally controls the above units.

The communication control device 2080 controls two-way communication with a higher-level device (for example, a personal computer) via a network or the like.

The photosensitive drum 2030a, the charging unit 2032a, the developing roller 2033a, the toner cartridge 2034a, and the cleaning unit 2031a are used as a set, and make up an image forming station for forming a black image (hereinafter, also referred to as a "K station" for convenience).

The photosensitive drum 2030b, the charging unit 2032b, the developing roller 2033b, the toner cartridge 2034b, and the cleaning unit 2031b are used as a set, and make up an image forming station for forming a yellow image (hereinafter, also referred to as a "Y station" for convenience).

The photosensitive drum 2030$c$, the charging unit 2032$c$, the developing roller 2033$c$, the toner cartridge 2034$c$, and the cleaning unit 2031$c$ are used as a set, and make up an image forming station for forming a cyan image (hereinafter, also referred to as a "C station" for convenience).

The photosensitive drum 2030$d$, the charging unit 2032$d$, the developing roller 2033$d$, the toner cartridge 2034$d$, and the cleaning unit 2031$d$ are used as a set, and make up an image forming station for forming a magenta image (hereinafter, also referred to as an "M station" for convenience).

A photosensitive layer is formed on the surface of each photosensitive drum. The surface of each photosensitive drum is a scanning surface that is to be scanned. Each photosensitive drum is rotated by a rotating mechanism in a direction indicated by an arrow in FIG. 1. In the specification, an XYZ three-dimensional Cartesian coordinate system is set up in a manner where a direction along the longitudinal direction of each photosensitive drum is a Y-axis direction and a direction along the arrangement direction of the four photosensitive drums is an X-axis direction.

Each charging unit uniformly charges the surface of a corresponding photosensitive drum.

The optical scanning device 2010 is arranged on the negative Z side of the four photosensitive drums. The optical scanning device 2010 irradiates the charged surface of each photosensitive drum with a light beam that is modulated for the corresponding color based on multicolor image information (black image information, cyan image information, magenta image information, and yellow image information) from the higher-level device. Accordingly, electric charges on the surface of each photosensitive drum are lost only from areas irradiated with the light, so that a latent image corresponding to the image information is formed on the surface of each photosensitive drum. The formed latent image moves in a direction toward a corresponding developing roller along with the rotation of the photosensitive drum. The configuration of the optical scanning device 2010 will be described later.

Black toner is stored in the toner cartridge 2034$a$, and is supplied to the developing roller 2033$a$. Yellow toner is stored in the toner cartridge 2034$b$, and is supplied to the developing roller 2033$b$. Cyan toner is stored in the toner cartridge 2034$c$, and is supplied to the developing roller 2033$c$. Magenta toner is stored in the toner cartridge 2034$d$, and is supplied to the developing roller 2033$d$.

Toner is thinly and uniformly applied from each toner cartridge to the surface of a corresponding developing roller along with rotation of the developing roller. Upon contact with the surface of a corresponding photosensitive drum, the toner on the surface of each developing roller is transferred onto only the irradiated areas on the surface of the photosensitive drum and sticks thereto. That is, each developing roller develops the latent image by causing the toner to adhere to the latent image formed on the surface of a corresponding photosensitive drum. The images (toner images), to which the toner is adhered, move in a direction toward the transfer belt 2040 along with the rotation of the photosensitive drums.

The toner images of magenta, cyan, yellow, and black are sequentially transferred onto the transfer belt 2040 so as to be superimposed on one another at predetermined timing, so that a color image is formed.

Recording sheets are stored in the feed tray 2060. The feed roller 2054 is arranged near the feed tray 2060. The feed roller 2054 picks up the recording sheets one by one from the feed tray 2060 and conveys each sheet to the registration roller pair 2056. The registration roller pair 2056 feeds the recording sheet to a nip between the transfer belt 2040 and the transfer roller 2042 at a predetermined timing. Accordingly, the color image on the transfer belt 2040 is transferred onto the recording sheet. The recording sheet with the transferred image is conveyed to the fixing roller 2050.

The fixing roller 2050 applies heat and pressure to the recording sheet, so that the toner is fixed on the recording sheet. The recording sheet with the fixed toner is conveyed to the discharge tray 2070 by the discharging roller 2058 and stacked on the discharge tray 2070 in order.

Each cleaning unit removes residual toner remaining on the surface of a corresponding photosensitive drum. The surface of each photosensitive drum, from which the residual toner is removed, returns to a position opposing a corresponding charging unit again.

The configuration of the optical scanning device 2010 will be described below.

Figure 2:
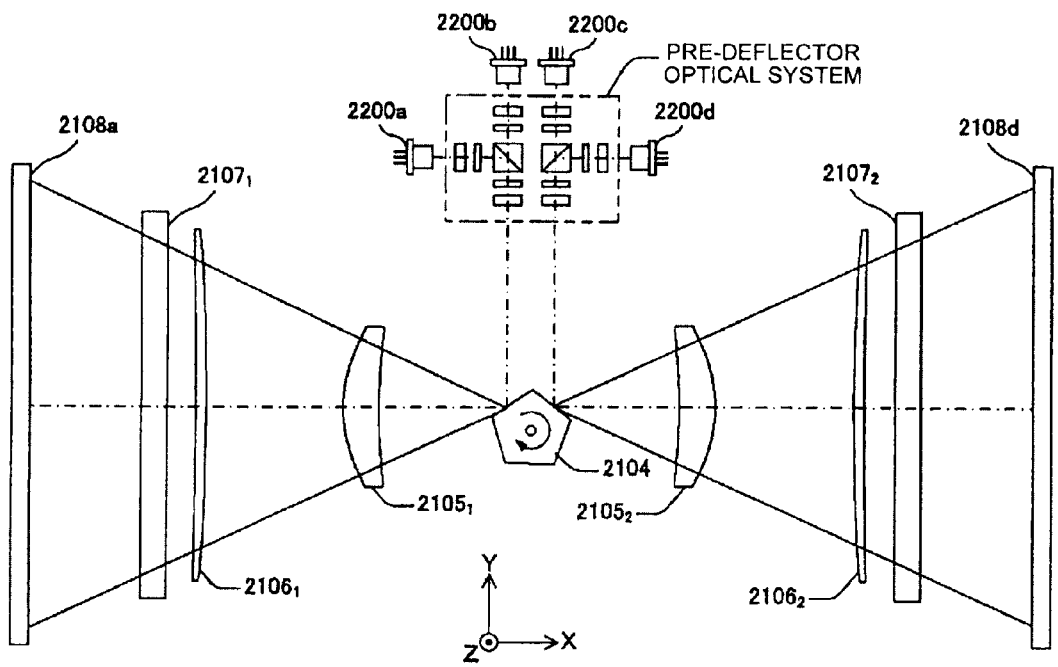
FIG. 2 is a diagram of a schematic configuration of an optical scanning device illustrated in FIG. 1.
Figure 3:
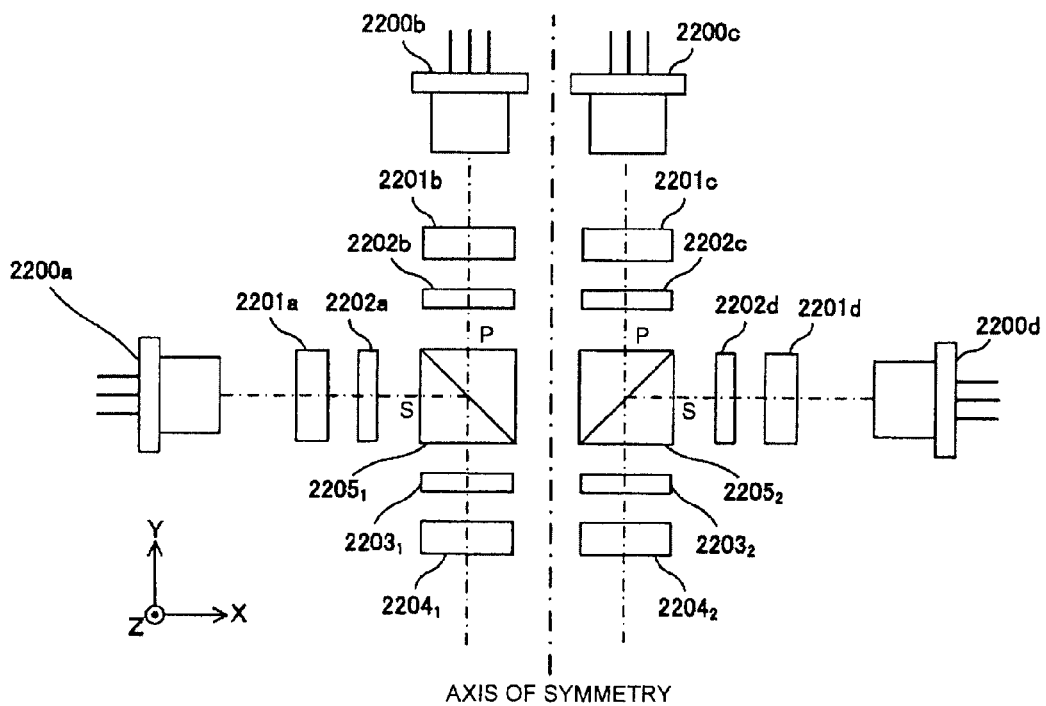
FIG. 3 is a diagram explaining a pre-deflector optical system illustrated in FIG. 2.

As illustrated in FIGS. 2 to 4 as an example, the optical scanning device 2010 includes four light sources (2200$a$, 2200$b$, 2200$c$, and 2200$d$), four coupling lenses (2201$a$, 2201$b$, 2201$c$, and 2201$d$), four half-wave plates (2202$a$, 2202$b$, 2202$c$, and 2202$d$), two beam synthesizing elements (2205$_1$ and 2205$_2$), two aperture plates (2203$_1$ and 2203$_2$), two linear-image forming lenses (2204$_1$ and 2204$_2$), a polygon mirror 2104, two deflector-side scanning lenses (2105$_1$ and 2105$_2$), two image-plane-side scanning lenses (2106$_1$ and 2106$_2$), two polarization separation elements (2107$_1$ and 2107$_2$), eight reflecting mirrors (2108$a$, 2108$b$, 2108$c$, 2108$d$, 2109$a$, 2109$b$, 2109$c$, and 2109$d$), and a scanning control device. The above units are assembled in an optical housing.

Of all of the reflecting mirrors, reflecting mirrors that are arranged to reflect a light beam so that the light beam can be guided to a corresponding photosensitive drum without being further reflected by other mirrors are also referred to as "last-stage reflecting mirrors". Here, the reflecting mirror 2109$a$, the reflecting mirror 2109$b$, the reflecting mirror 2109$c$, and the reflecting mirror 2109$d$ are the last-stage reflecting mirrors.

In the following, a direction corresponding to the main-scanning direction is referred to as a "main-scanning corresponding direction" and a direction corresponding to the sub-scanning direction is referred to as a "sub-scanning corresponding direction", for convenience.

Figure 5A:
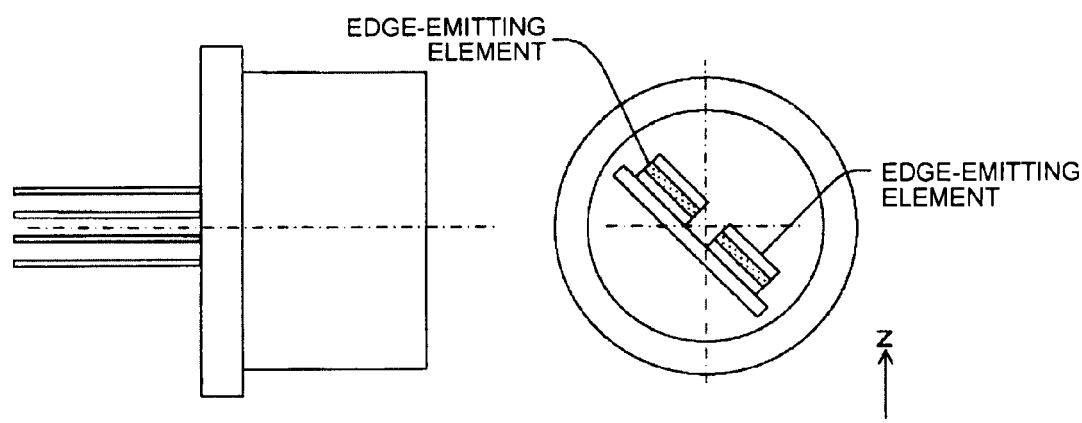
FIGS. 5A and 5B are diagrams explaining a light source.
Figure 5B:
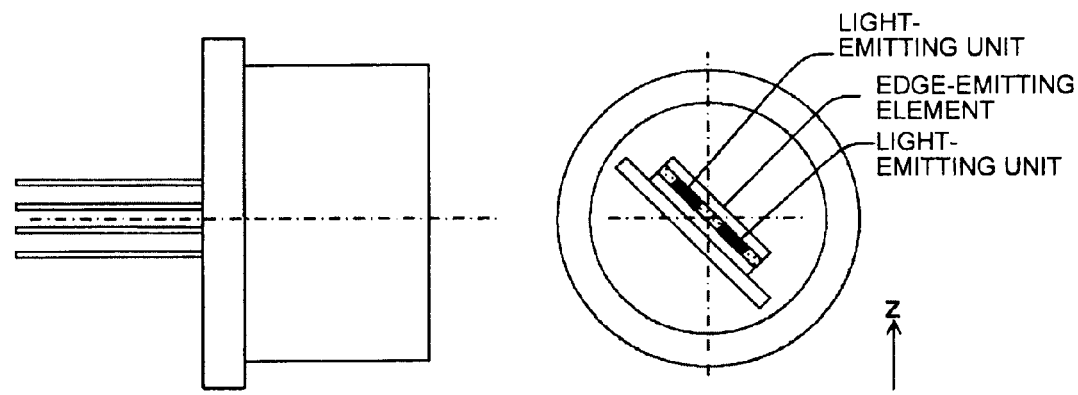

As illustrated in FIG. 5A as an example, each light source includes a semiconductor laser formed of two edge-emitting elements accommodated in a metal package or the like. As illustrated in FIG. 5B as an example, it is possible to use a single edge-emitting element having two light-emitting units, instead of the two edge-emitting elements.

Figure 6:
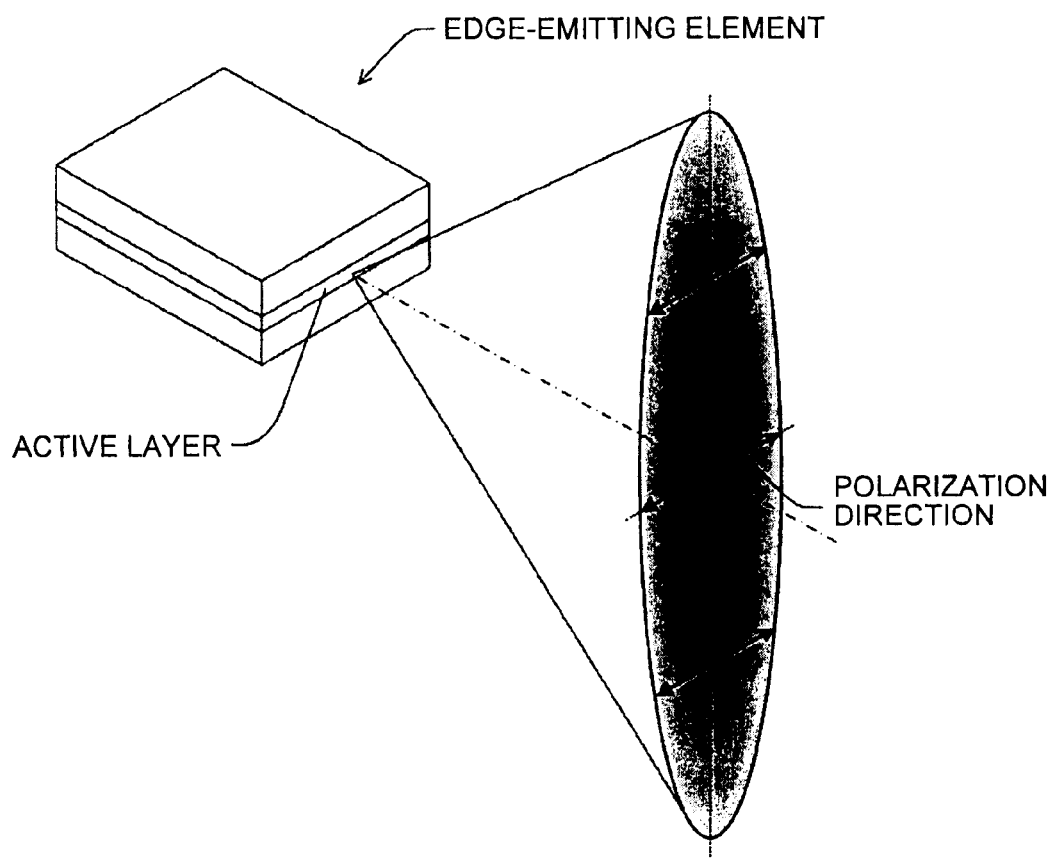
FIG. 6 is a diagram explaining an edge-emitting element.

A typical edge-emitting element has a double heterostructure in which a p-type semiconductor material and an n-type semiconductor material are joined. When an electric current is injected into the junction, a laser beam is emitted from an active layer formed at the junction. It is known that the laser beam emitted from a light source having such a structure is polarized in a direction parallel to the active layer as illustrated in FIG. 6 as an example.

Referring back to FIG. 3, the light source 2200$b$ and the light source 2200$c$ are placed at a distance from each other in the X-axis direction, and emit light beams in the negative Y direction. The light source 2200$a$ and the light source 2200$d$ are placed opposite each other in the X-axis direction. The light source 2200$a$ emits a light beam in the positive X direction and the light source 2200$d$ emits a light beam in the negative X direction.

In the following, a light beam emitted by the light source $2200a$ is referred to as a "light beam LBa"; a light beam emitted by the light source $2200b$ is referred to as a "light beam LBb"; a light beam emitted by the light source $2200c$ is referred to as a "light beam LBc"; and a light beam emitted by the light source $2200d$ is referred to as a "light beam LBd", for convenience.

The coupling lens $2201a$ is arranged on an optical path of the light beam LBa emitted from the light source $2200a$, and collimates the light beam LBa into an approximately parallel light beam.

The coupling lens $2201b$ is arranged on an optical path of the light beam LBb emitted from the light source $2200b$, and collimates the light beam LBb into an approximately parallel light beam.

The coupling lens $2201c$ is arranged on an optical path of the light beam LBc emitted from the light source $2200c$, and collimates the light beam LBc into an approximately parallel light beam.

The coupling lens $2201d$ is arranged on an optical path of the light beam LBd emitted from the light source $2200d$, and collimates the light beam LBd into an approximately parallel light beam.

Thus, a coupling lens is arranged for each light-emitting unit.

Figure 7:
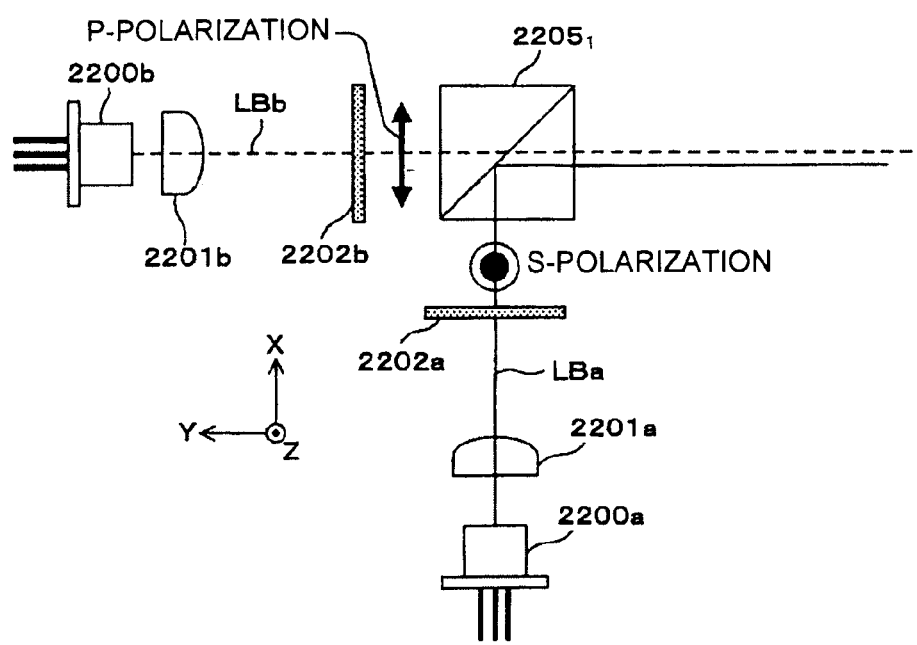
FIG. 7 is a diagram explaining a beam synthesizing element $2205_1$.

The half-wave plate $2202a$ is arranged on an optical path of the light beam LBa that has passed through the coupling lens $2201a$. As illustrated in FIG. 7 as an example, the half-wave plate $2202a$ converts the light beam LBa to an s-polarized beam with respect to an incidence surface of the beam synthesizing element $2205_1$.

The half-wave plate $2202b$ is arranged on an optical path of the light beam LBb that has passed through the coupling lens $2201b$. As illustrated in FIG. 7 as an example, the half-wave plate $2202b$ converts the light beam LBb to a p-polarized beam with respect to the incidence surface of the beam synthesizing element $2205_1$.

Figure 8:
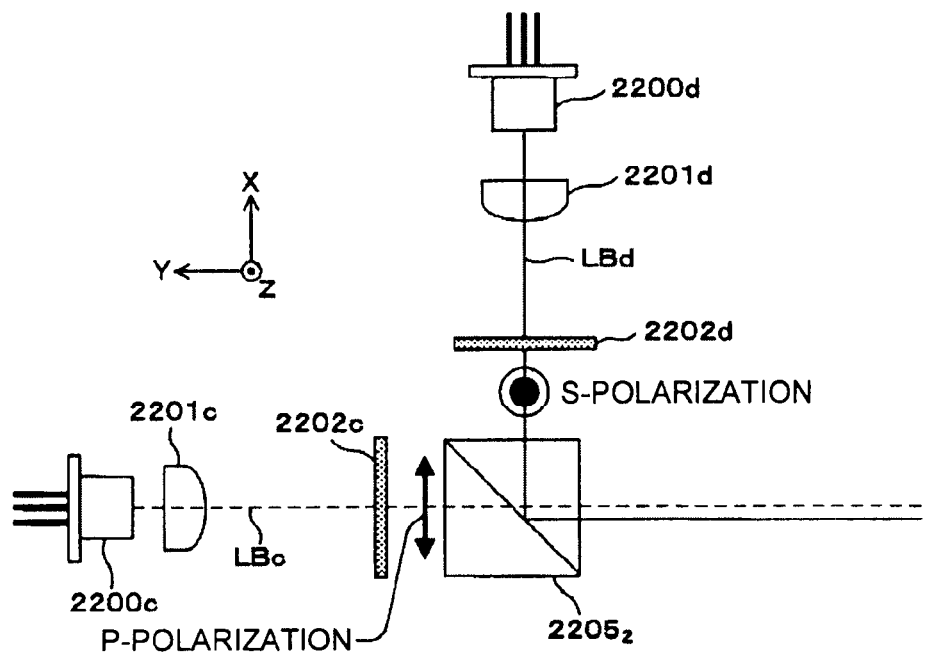
FIG. 8 is a diagram explaining a beam synthesizing element $2205_2$.

The half-wave plate $2202c$ is arranged on an optical path of the light beam LBc that has passed through the coupling lens $2201c$. As illustrated in FIG. 8 as an example, the half-wave plate $2202c$ converts the light beam LBc to a p-polarized beam with respect to an incidence surface of the beam synthesizing element $2205_2$.

The half-wave plate $2202d$ is arranged on an optical path of the light beam LBd that has passed through the coupling lens $2201d$. As illustrated in FIG. 8 as an example, the half-wave plate $2202c$ converts the light beam LBc to an s-polarized beam with respect to the incidence surface of the beam synthesizing element $2205_2$.

The beam synthesizing element $2205_1$ is arranged on the positive X side of the half-wave plate $2202a$ and on the negative Y side of the half-wave plate $2202b$. The beam synthesizing element $2205_1$ is a polarized-beam splitter with characteristics of transmitting the p-polarized beam and reflecting the s-polarized beam. The beam synthesizing element $2205_1$ reflects the light beam LBa, which has passed through the half-wave plate $2202a$, in the negative Y direction, and transmits the light beam LBb that has passed through the half-wave plate $2202b$. Therefore, the optical paths of the light beams LBa and LBb emitted from the beam synthesizing element $2205_1$ become approximately the same.

The beam synthesizing element $2205_2$ is arranged on the negative X side of the half-wave plate $2202d$ and on the negative Y side of the half-wave plate $2202c$. The beam synthesizing element $2205_2$ is a polarized-beam splitter with characteristics of transmitting the p-polarized beam and reflecting the s-polarized beam. The beam synthesizing element $2205_2$ reflects the light beam LBd, which has passed through the half-wave plate $2202d$, in the negative Y direction, and transmits the light beam LBc that has passed through the half-wave plate $2202c$. Therefore, the optical paths of the light beams LBc and LBd emitted from the beam synthesizing element $2205_2$ become approximately the same.

Each beam synthesizing element is a cube type element formed of two triangular prisms bonded at a beam splitting surface. The beam splitting surface can be formed of a wire grid, a dielectric multilayer, or the like. Each beam synthesizing element may be a plate type element that has a beam splitting surface on one side surface of a parallel plate.

Referring back to FIG. 3, the aperture plate $2203_1$ has an aperture and shapes the light beams LBa and LBb from the beam synthesizing element $2205_1$.

The aperture plate $2203_2$ has an aperture and shapes the light beams LBc and LBd from the beam synthesizing element $2205_2$.

The linear-image forming lens $2204_1$ focuses the light beams LBa and LBb that have passed through the aperture of the aperture plate $2203_1$ to form images near a deflection reflection surface of the polygon mirror $2104$ in the Z-axis direction.

The linear-image forming lens $2204_2$ focuses the light beams LBc and LBd that have passed through the aperture of the aperture plate $2203_2$ to form images near the deflection reflection surface of the polygon mirror $2104$ in the Z-axis direction.

Figure 9:
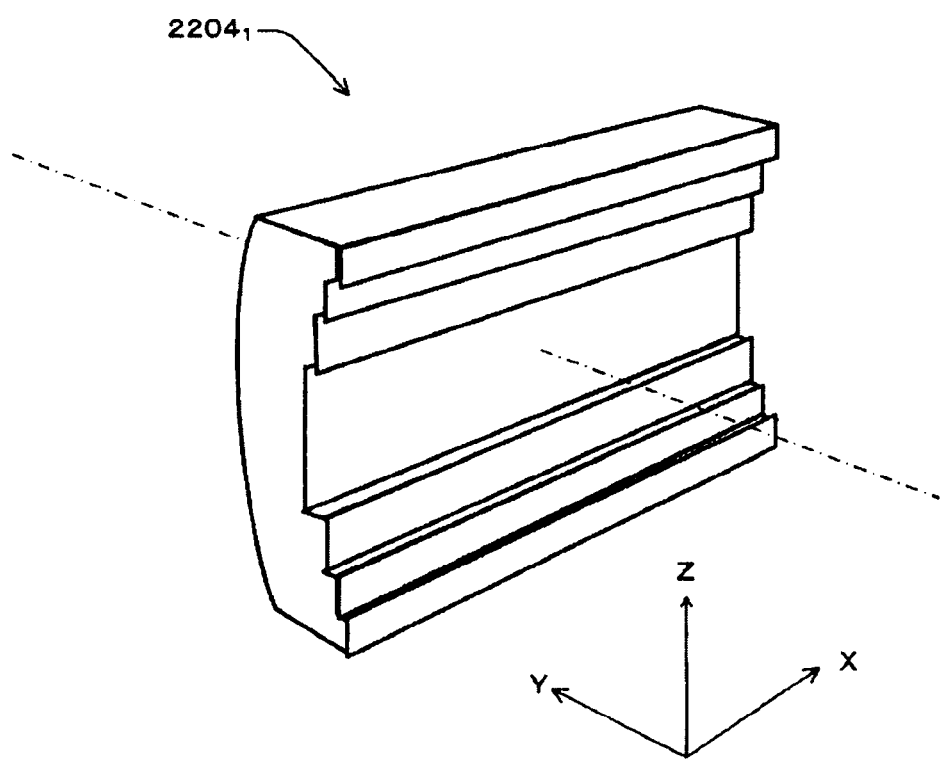
FIG. 9 is a diagram explaining a diffraction lens.

In this embodiment, a diffraction lens that has a cylindrical surface on an incidence surface and has a diffractive surface on an emission surface is used as each linear-image forming lens (see FIG. 9). Due to the strong negative dispersion characteristics of the diffraction surface, the diffraction lens has a function to correct focus deviation on the surface of the photosensitive drum based on a variation in the wavelength of the light source when a temperature of the optical scanning device varies. Therefore, even when the deflector-side scanning lens is arranged near the polygon mirror $2104$ and the scanning optical system becomes a magnifying system, it is possible to suppress reduction in the scanning accuracy. When the temperature correction need not be taken into account, it is possible to use a cylindrical lens as each linear-image forming lens.

In this manner, the four coupling lenses ($2201a$, $2201b$, $2201c$, and $2201d$), the four half-wave plates ($2202a$, $2202b$, $2202c$, and $2202d$), the two beam synthesizing elements ($2205_1$ and $2205_2$), the two aperture plates ($2203_1$ and $2203_2$), and the two linear-image forming lenses ($2204_1$ and $2204_2$) form a pre-deflector optical system.

In the pre-deflector optical system, an optical system related to the light beams LBa and LBb (a first pre-deflector optical system) and an optical system related to the light beams LBc and LBd (a second pre-deflector optical system) are arranged so as to be symmetric with respect to a straight line that passes through the center of rotation of the polygon mirror $2104$ and that is parallel to the Y-axis direction.

The optical path of each light beam (the light beam LBa, the light beam LBb, the light beam LBc, and the light beam LBd) emitted from the pre-deflector optical system is parallel to the Y-axis direction. With this configuration, it is possible to avoid interference with light beams that are emitted from the optical scanning device $2010$ toward the photosensitive drums.

Referring back to FIG. 2, the polygon mirror $2104$ is formed of, for example, five mirrors, and each mirror serves as a reflecting surface. The polygon mirror $2104$ is rotated about an axis parallel to the Z-axis direction at a constant speed by a motor mechanism to thereby deflect a light beam from each linear-image forming lens. The motor mechanism is arranged on the negative Z side of the polygon mirror 2104 (see FIG. 4).

The light beams (the light beams LBa and LBb) from the linear-image forming lens 2204$_1$ are deflected toward the negative X side of the polygon mirror 2104, and the light beams (the light beams LBc and LBd) from the linear-image forming lens 2204$_2$ are deflected toward the positive X side of the polygon mirror 2104. A light beam plane that is formed by a light beam deflected by the deflection reflection surface of the polygon mirror 2104 is referred to as a "deflected surface" (see Japanese Patent Application Laid-open No. H11-202252). The deflected surface is parallel to the XY plane.

The deflector-side scanning lens 2105$_1$ is arranged on the negative X side of the polygon mirror 2104 and on the optical path of the light beams (the light beams LBa and LBb) that have been emitted from the linear-image forming lens 2204$_1$ and deflected by the polygon mirror 2104.

The deflector-side scanning lens 2105$_2$ is arranged on the positive X side of the polygon mirror 2104 and on the optical path of the light beams (the light beams LBc and LBd) that have been emitted from the linear-image forming lens 2204$_2$ and deflected by the polygon mirror 2104.

Each deflector-side scanning lens is made of glass, so that it is not necessary to take into account the birefringence of a light beam.

The image-plane-side scanning lens 2106$_1$ is arranged on the negative X side of the deflector-side scanning lens 2105$_1$ and on the optical path of the light beams (the light beams LBa and LBb) that have passed through the deflector-side scanning lens 2105$_1$.

The image-plane-side scanning lens 2106$_2$ is arranged on the positive X side of the deflector-side scanning lens 2105$_2$ and on the optical path of the light beams (the light beams LBc and LBd) that have passed through the deflector-side scanning lens 2105$_2$.

Each image-plane-side scanning lens is made of resin, and can perform aberration correction with high accuracy.

In general, birefringence largely appears on a molded resin scanning lens. On the other hand, a scanning lens made of amorphous glass generally has isotropic optical properties and has birefringence that is nearly zero. Therefore, use of a glass scanning lens is effective to ensure good separation characteristics of the polarization separation element. However, because the molded resin scanning lens has extremely high flexibility in the shape of an optical surface, it is necessary to use a resin scanning lens in order to obtain good imaging characteristics on a scanning surface. The birefringence of the resin scanning lens is influenced by thickness, uniformity of the thickness, flatness, and the like. Therefore, in one, a glass scanning lens that has small birefringence is used as the deflector-side scanning lens, and a resin scanning lens that is designed to be thin and flat as much as possible is used as the image-plane-side scanning lens in order to simultaneously achieve reduction in the birefringence and improvement in the image forming characteristics as a scanning lens system.

Figure 10:
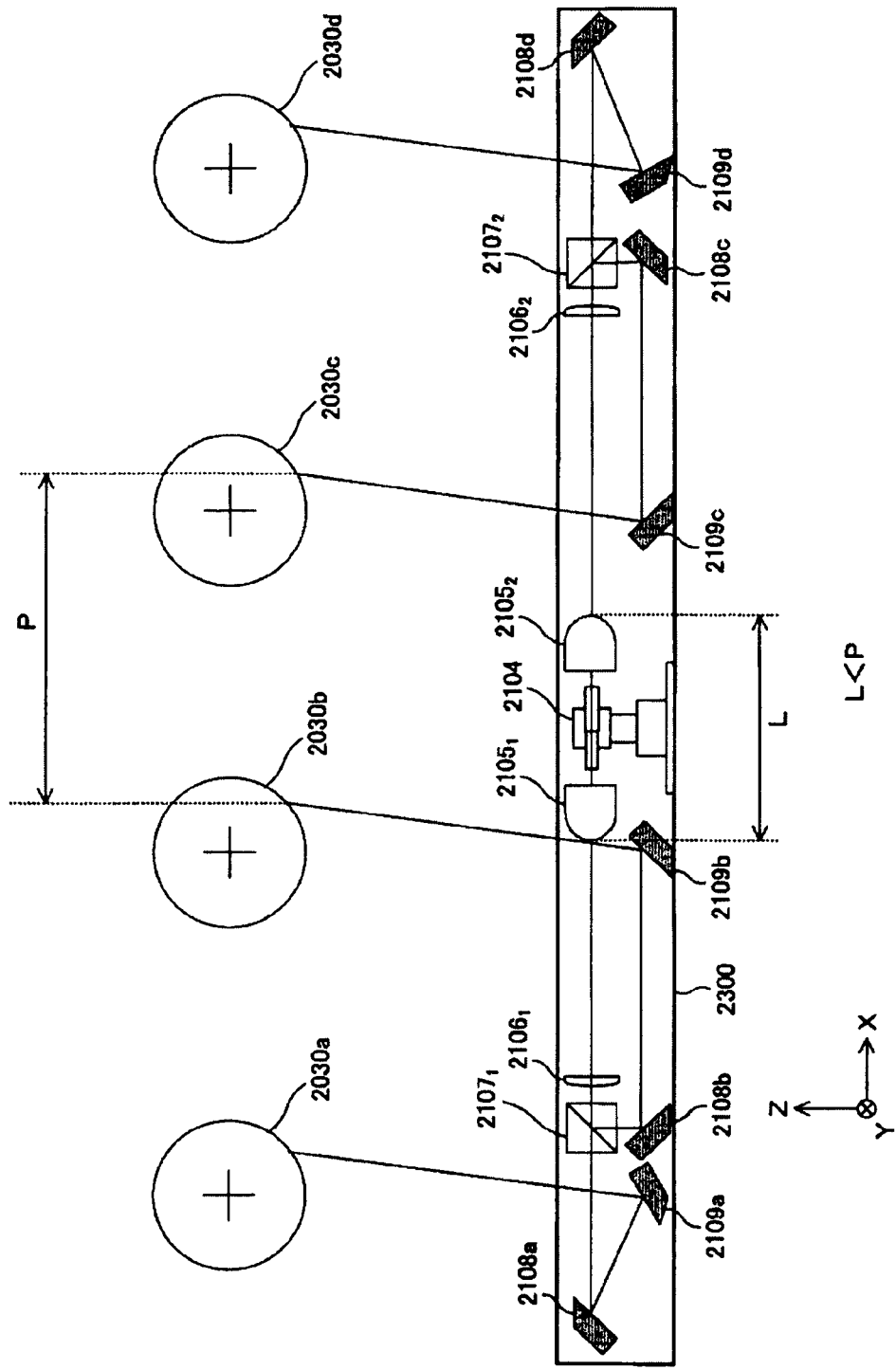
FIG. 10 is a diagram explaining a relation of an interval P between imaging positions on photosensitive drums 2030b and 2030c and a distance L between emission-side surfaces of deflector-side scanning lenses $2105_1$ and $2105_2$.

The deflector-side scanning lenses are arranged on respective sides of the polygon mirror 2104. As illustrated in FIG. 10, the deflector-side scanning lenses are arranged so that P>L, where L is an interval between the emission-side surfaces of the deflector-side scanning lenses and P is an interval between imaging positions on the central two photosensitive drums (2030$b$ and 2030$c$).

With this arrangement, the light beam emitted from the last-stage reflecting mirror 2109$b$ can travel toward the photosensitive drum 2030$b$ without interference with the deflector-side scanning lens 2105$_1$. Furthermore, the last-stage reflecting mirror 2109$b$ and the deflector-side scanning lens 2105$_1$ do not physically interfere with each other. Similarly, the light beam emitted from the last-stage reflecting mirror 2109$c$ can travel toward the photosensitive drum 2030$c$ without interference with the deflector-side scanning lens 2105$_2$. Furthermore, the last-stage reflecting mirror 2109$c$ and the deflector-side scanning lens 2105$_2$ do not physically interfere with each other.

Accordingly, the length of each deflector-side scanning lens in the main-scanning corresponding direction is shortened.

When the motor mechanism of the polygon mirror 2104 is heated by driving, the heat is transmitted to an adjacent optical element and causes the optical element to thermally expand, so that optical characteristics may be reduced. However, according to one one embodiment, because each deflector-side scanning lens is made of glass with a small linear expansion coefficient, it is possible to suppress influence of heat from the motor mechanism. That is, because each deflector-side scanning lens is made of glass, it is possible to arrange the optical element near the polygon mirror 2104 while maintaining robustness of the optical characteristics against change due to a temperature. Furthermore, in the layout using the polarization separation element according to one one embodiment, a plurality of light beams is incident on the scanning lens without being skewed and with use of the same optical path. Therefore, this layout is advantageous in terms of the above-mentioned robustness compared with a system that is downsized by using grazing incidence.

The polarization separation element 2107$_1$ is arranged on the negative X side of the image-plane-side scanning lens 2106$_1$ and on the optical path of the light beams (the light beams LBa and LBb) that have passed through the image-plane-side scanning lens 2106$_1$.

The polarization separation element 2107$_2$ is arranged on the positive X side of the image-plane-side scanning lens 2106$_2$ and on the optical path of the light beams (the light beams LBc and LBd) that have passed through the image-plane-side scanning lens 2106$_2$.

Figure 11:
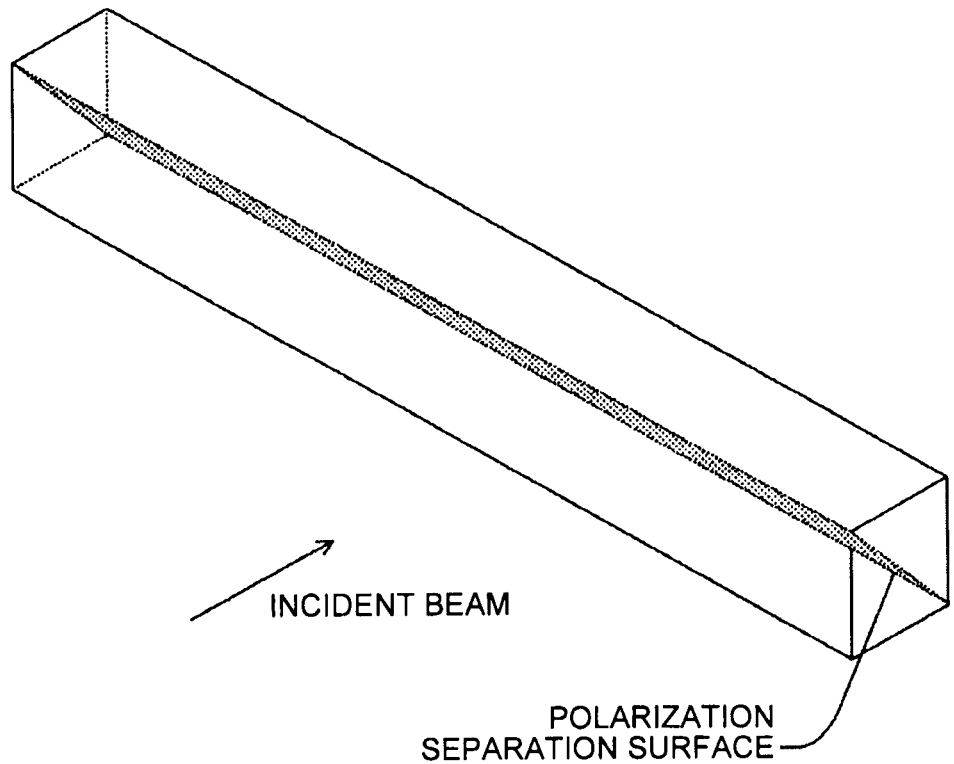
FIG. 11 is a diagram explaining a polarization separation element.
Figure 12:
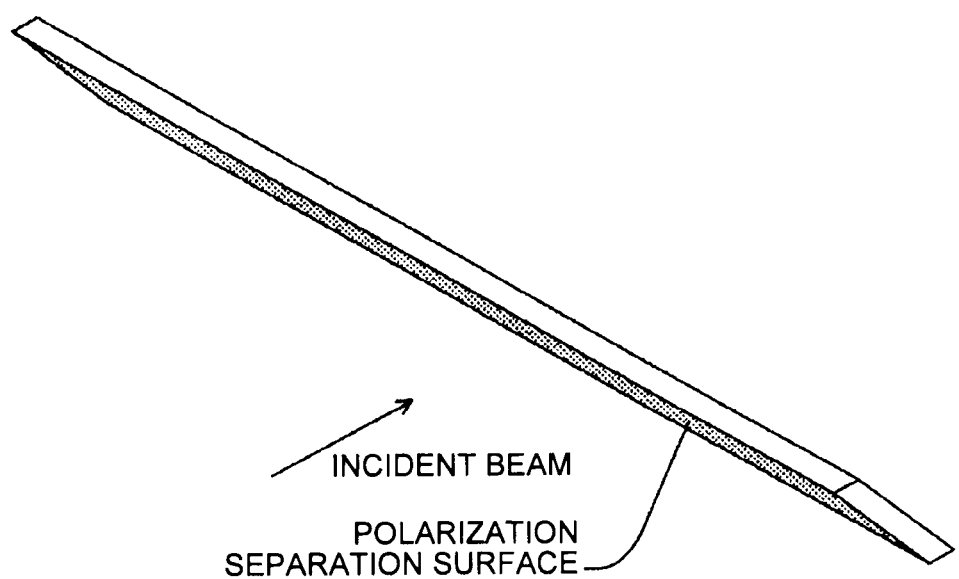
FIG. 12 is a diagram explaining a first modification of the polarization separation element.
Figure 13:
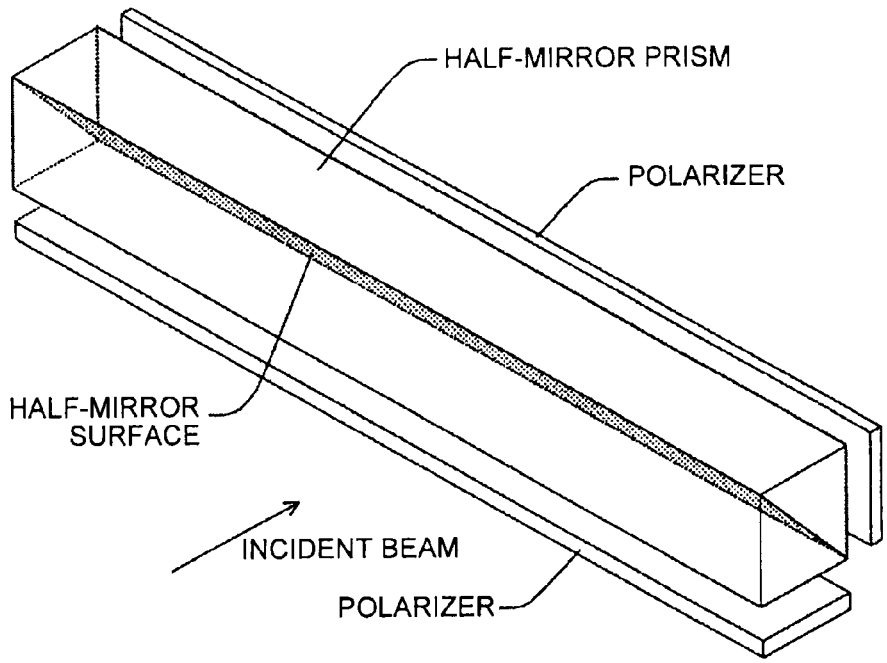
FIG. 13 is a diagram explaining a second modification of the polarization separation element.

As illustrated in FIG. 11 as an example, each polarization separation element is formed of two triangular prisms bonded at a polarization separation surface. As illustrated in FIG. 12, it is possible to use a resin long parallel plate as each polarization separation element. In this case, a surface on the incidence side serves as the polarization separation surface. This surface is formed of a wire-grid surface over which a nano-sized metallic thin wire is arranged in a regular manner. The pattern of the wire grid is designed in accordance with necessary polarization separation characteristics. As illustrated in FIG. 13, it is possible to use, as each polarization separation element, a resin long half-mirror prism and two polarizers. In this case, a light beam split by the half mirror is polarized and selected by the polarizers that are perpendicular to each other.

Each polarization separation element is arranged so that the polarization separation surface is inclined by 45° with respect to the deflected surface.

A polarization separation element 2110$_1$ transmits the light beam LBa and reflects the light beam LBb in the negative Z direction. A polarization separation element 2110$_2$ transmits the light beam LBd and reflects the light beam LBc in the negative Z direction.

A typical polarization separation element has a function of splitting an incident beam into two linearly-polarized beams that are perpendicular to each other. In this specification, the following characteristics will be described as "polarization separation characteristics". That is, when a light beam containing the two linearly-polarized beams (La and Lb) that are polarized in mutually-perpendicular directions is incident on the polarization separation element, the light beams are respectively split into light beams La' and Lb' in accordance with the respective polarization directions and without mixture.

Assuming that the amounts of light of the light beams La, Lb, La', and Lb' are denoted by A, B, A', and B', respectively, and when ideal polarization separation characteristics are obtained, A∝A' and B∝B'. Therefore, B and A are not influenced by A' and B'.

Figure 14:
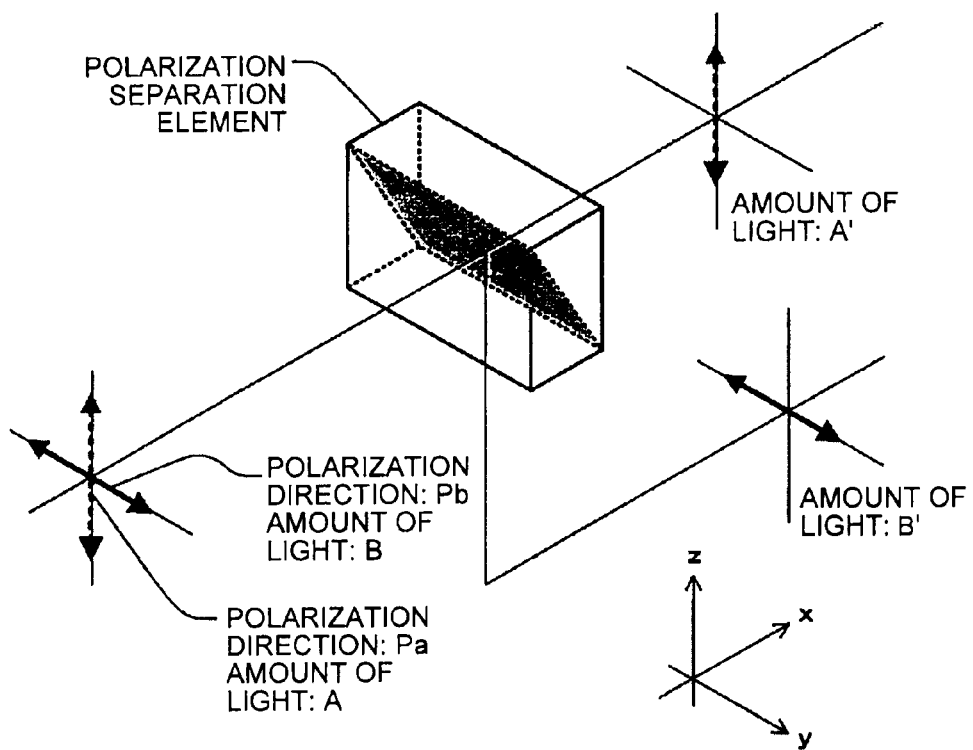
FIG. 14 is a diagram explaining ideal polarization separation characteristics.

FIG. 14 is a functional schematic diagram of the polarization separation element. The polarization directions of the light beams La and Lb are denoted by Pa and Pb, respectively. Pa and Pb are perpendicular to each other. Pa is parallel to the Z-axis and Pb is parallel to the Y-axis. The polarization separation element with ideal polarization separation characteristics splits an optical path in accordance with the perpendicular polarization directions.

Here, a case will be discussed below, in which the light beams La and Lb pass through a birefringent member. "Birefringent" means that the refractive index by which a light beam is influenced becomes different depending on a direction of the light beam. In an actual optical scanning device, a resin scanning lens is widely used because of high production efficiency and easiness to form a complicated surface shape. Such a resin optical element generally has birefringence and acts like an optically anisotropic medium.

In a resin optical element that is manufactured by molding a resin material by blow molding or the like, resin polymers may be coagulated in the same orientation within a certain region while a molding process is being performed, so that the resin optical element may have optical anisotropy in some parts inside the optical element. When a linearly-polarized beam is incident on such an optical element, a phase difference occurs in the perpendicular cross-section because of basic characteristics of the optically anisotropic medium, so that the polarization direction is rotated. In a case of a glass optical element, the optical element has amorphous structure inside thereof, so that the optical element is optically isotropic and birefringence does not generally occur unlike in the case of the resin optical element.

Figure 15:
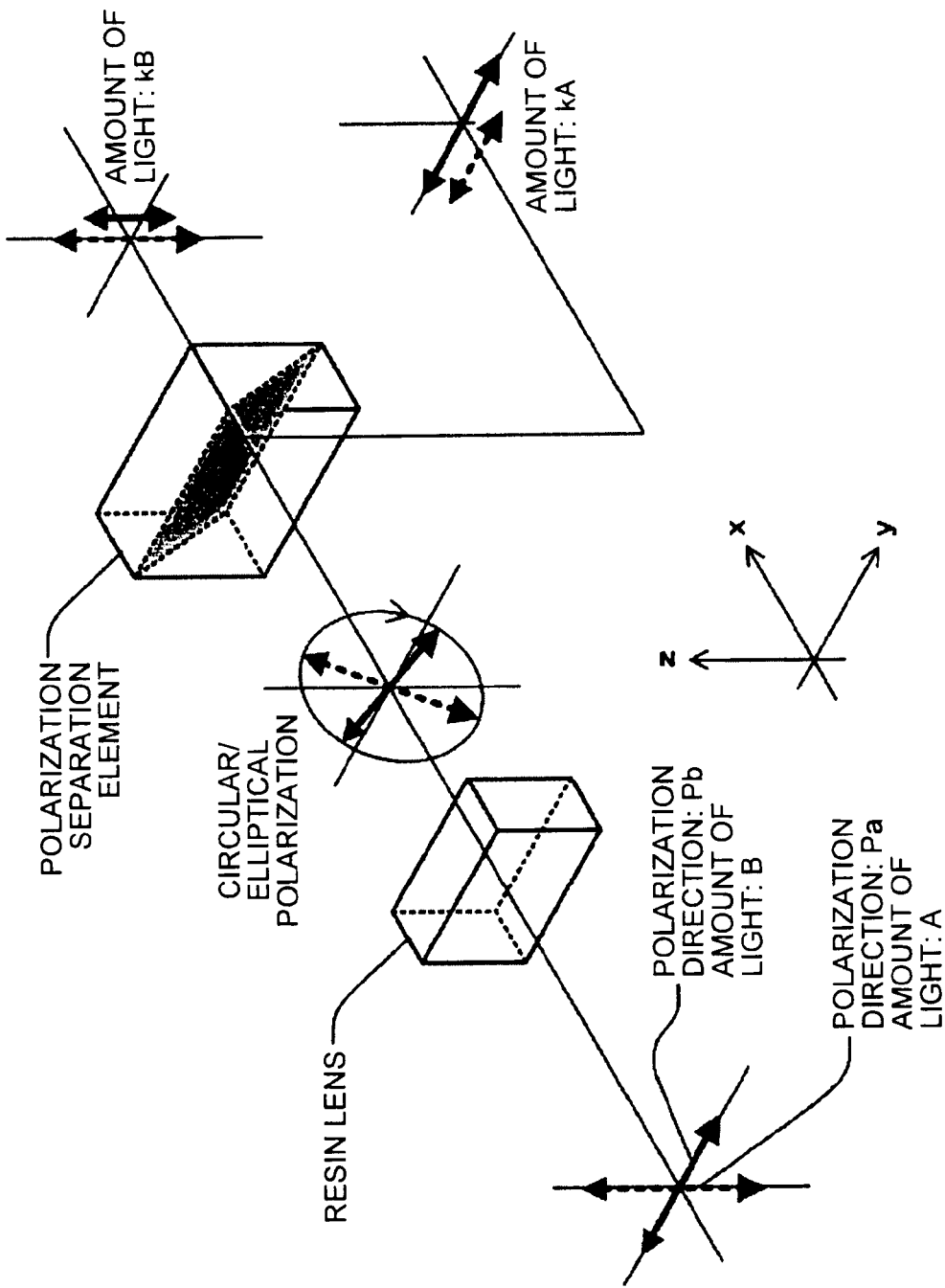
FIG. 15 is a diagram explaining how a light beam that has passed through a birefringent resin lens is incident on the polarization separation element.

Therefore, as illustrated in FIG. 15, when the light beams La and Lb are incident on the resin lens with birefringence (hereinafter, briefly described as the "resin lens"), the polarization directions are rotated. Therefore, an emitted beam becomes a linearly-polarized beam or an elliptically-polarized beam because of the birefringence. When such a polarized beam is incident on the polarization separation element, the amounts of emitted light A' and B' of the polarization separation elements become A'∝(A+kB) and B'∝(B+kA) (k is a proportionality coefficient), in which the amounts of other beams are mixed. This phenomenon is called as "crosstalk of light amount", which represents degradation of the polarization separation characteristics.

The birefringence of a resin lens is caused by, for example, stagnation of resin flow at the time of blow molding or uneven coagulation at the time of cooling. The birefringence is intensified in proportion to a thickness or the degree of thickness deviation. Therefore, a resin lens that is thin and has small thickness deviation is less influenced by birefringence.

However, it is difficult to correct aberration on the scanning lens with only a single resin lens that is thin and has small thickness deviation, and such a configuration may lead to failure to provide high image quality. On the other hand, when the number of resin lenses is increased, the influence of the birefringence is accumulated, leading to deterioration of the polarization separation characteristics.

In this case, it may be possible to employ a system in which a resin lens is arranged on the subsequent stage of a polarization separation element. However, if a resin lens is arranged on the optical path of each of two light beams that are split by the polarization separation element, layout of the subsequent stage of the polarization separation element becomes limited, failing to make the optical scanning device thin.

Referring back to FIG. 4, the reflecting mirror 2108a is arranged on the negative X side of the polarization separation element $2107_1$ and on the optical path of the light beam LBa that has passed through the polarization separation element $2107_1$. The reflecting mirror 2108a folds the optical path of the light beam LBa toward the negative Z side.

The reflecting mirror 2109a is arranged on the negative Z side with respect to the optical path of the light beam LBa that travels from the polarization separation element $2107_1$ to the reflecting mirror 2108a and on the optical path of the light beam LBa that comes from the reflecting mirror 2108a. The reflecting mirror 2109a folds the optical path of the light beam LBa toward the photosensitive drum 2030a.

The light beam LBa that comes from the reflecting mirror 2109a is applied to the surface of the photosensitive drum 2030a, so that an optical spot is formed. The optical spot moves in the longitudinal direction of the photosensitive drum 2030a along with the rotation of the polygon mirror 2104. That is, the photosensitive drum 2030a is scanned with the optical spot. The moving direction of the optical spot at this time is the "main-scanning direction" on the photosensitive drum 2030a, and the rotation direction of the photosensitive drum 2030a is the "sub-scanning direction" on the photosensitive drum 2030a.

In this manner, the deflector-side scanning lens $2105_1$, the image-plane-side scanning lens $2106_1$, the polarization separation element $2107_1$, and the two reflecting mirrors (2108a and 2109a) form a scanning optical system of the "K station". The deflector-side scanning lens $2105_1$ and the image-plane-side scanning lens $2106_1$ form a scanning lens system of the "K station".

The reflecting mirror 2108b is arranged on the negative Z side of the polarization separation element $2107_1$ and on the optical path of the light beam LBb that has been reflected by the polarization separation element $2107_1$. The reflecting mirror 2108b folds the optical path of the light beam LBb in the positive X direction.

The reflecting mirror 2109b is arranged on the positive X side of the reflecting mirror 2108b and on the optical path of the light beam LBb that comes from the reflecting mirror 2108b. The reflecting mirror 2109b folds the optical path of the light beam LBb toward the photosensitive drum 2030b.

The light beam LBb that comes from the reflecting mirror 2109b is applied to the surface of the photosensitive drum 2030b, so that an optical spot is formed. The optical spot moves in the longitudinal direction of the photosensitive drum 2030b along with the rotation of the polygon mirror 2104. That is, the photosensitive drum 2030b is scanned with the optical spot. The moving direction of the optical spot at this time is the "main-scanning direction" on the photosensitive drum 2030b, and the rotation direction of the photosensitive drum 2030b is the "sub-scanning direction" on the photosensitive drum 2030b.

In this manner, the deflector-side scanning lens $2105_1$, the image-plane-side scanning lens $2106_1$, the polarization separation element $2107_1$, and the two reflecting mirrors (2108b and 2109b) form a scanning optical system of the "Y station".

The deflector-side scanning lens $2105_1$ and the image-plane-side scanning lens $2106_1$ form a scanning lens system of the "Y station".

That is, the deflector-side scanning lens $2105_1$, the image-plane-side scanning lens $2106_1$, and the polarization separation element $2107_1$ are shared by the two image forming stations.

The reflecting mirror 2108c is arranged on the negative Z side of the polarization separation element $2107_2$ and on the optical path of the light beam LBc that has been reflected by the polarization separation element $2107_2$. The reflecting mirror 2108c folds the optical path of the light beam LBc in the negative X direction.

The reflecting mirror 2109c is arranged on the negative X side of the reflecting mirror 2108c and on the optical path of the light beam LBc that comes from the reflecting mirror 2108c. The reflecting mirror 2109c folds the optical path of the light beam LBc toward the photosensitive drum 2030c.

The light beam LBc that comes from the reflecting mirror 2109c is applied to the surface of the photosensitive drum 2030c, so that an optical spot is formed. The optical spot moves in the longitudinal direction of the photosensitive drum 2030c along with the rotation of the polygon mirror 2104. That is, the photosensitive drum 2030c is scanned with the optical spot. The moving direction of the optical spot at this time is the "main-scanning direction" on the photosensitive drum 2030c, and the rotation direction of the photosensitive drum 2030c is the "sub-scanning direction" on the photosensitive drum 2030c.

In this manner, the deflector-side scanning lens $2105_2$, the image-plane-side scanning lens $2106_2$, the polarization separation element $2107_2$, and the two reflecting mirrors (2108c and 2109c) form a scanning optical system of the "C station". The deflector-side scanning lens $2105_2$ and the image-plane-side scanning lens $2106_2$ form a scanning lens system of the "C station".

The reflecting mirror 2108d is arranged on the positive X side of the polarization separation element $2107_2$ and on the optical path of the light beam LBd that has passed through the polarization separation element $2107_2$. The reflecting mirror 2108d folds the optical path of the light beam LBd in the negative Z side.

The reflecting mirror 2109d is arranged on the negative Z side with respect to the optical path of the light beam LBd that travels from the polarization separation element $2107_2$ to the reflecting mirror 2108d and on the optical path of the light beam LBd that comes from the reflecting mirror 2108d. The reflecting mirror 2109d folds the optical path of the light beam LBd toward the photosensitive drum 2030d.

The light beam LBd that comes from the reflecting mirror 2109d is applied to the surface of the photosensitive drum 2030d, so that an optical spot is formed. The optical spot moves in the longitudinal direction of the photosensitive drum 2030d along with the rotation of the polygon mirror 2104. That is, the photosensitive drum 2030d is scanned with the optical spot. The moving direction of the optical spot at this time is the "main-scanning direction" on the photosensitive drum 2030d, and the rotation direction of the photosensitive drum 2030d is the "sub-scanning direction" on the photosensitive drum 2030d.

In this manner, the deflector-side scanning lens $2105_2$, the image-plane-side scanning lens $2106_2$, the polarization separation element $2107_2$, and the two reflecting mirrors (2108d and 2109d) form a scanning optical system of the "M station". The deflector-side scanning lens $2105_2$ and the image-plane-side scanning lens $2106_2$ form a scanning lens system of the "M station".

That is, the deflector-side scanning lens $2105_2$, the image-plane-side scanning lens $2106_2$, and the polarization separation element $2107_2$ are shared by the two image forming stations.

The interval between the last-stage reflecting mirrors (2109a, 2109b, 2109c, and 2109d) in the X-axis direction is approximately the same as a distance between the axes of the photosensitive drums or the interval between the imaging positions of the photosensitive drums. Therefore, the interval between the imaging positions in the X-axis direction can be approximately obtained based on the interval between the last-stage reflecting mirrors.

The two last-stage reflecting mirrors (2109a and 2109b) are arranged on the negative X side of the motor mechanism of the polygon mirror 2104, and the two last-stage reflecting mirrors (2109c and 2109d) are arranged on the positive X side of the motor mechanism of the polygon mirror 2104. All of the last-stage reflecting mirrors (2109a, 2109b, 2109c, and 2109d) are arranged between the light beam deflected by the polygon mirror 2104 and the bottom plate of the optical housing in the Z-axis direction. With this arrangement, the optical paths of the light beams that have reflected by the last-stage reflecting mirrors and that travel toward the photosensitive drums intersect the optical paths of the light beams that travel from the polygon mirror 2104 to the polarization separation elements. By arranging the optical elements as described above, it is possible to obtain the optical housing that is extremely small in size in the Z-axis direction, that is, an extremely thin optical scanning device.

When a glass scanning lens is used, because the flexibility in the shape of the optical surface is lower than that of a resin lens, it becomes difficult to correct imaging characteristics. Therefore, it is desirable to reduce the angle of view as much as possible. However, if a write width (valid scanning area) on the photosensitive drums remains unchanged, a longer optical path is needed as the angle of view is decreased. A long optical path is difficult to fold, which is disadvantageous in downsizing of the optical scanning device. In view of this, arranging the last-stage reflecting mirrors so as to allow light beams to intersect each other as described above in one one embodiment is greatly advantageous to enable folding the long optical path within a narrow space.

The reflecting mirrors are generally parallel plates. However, in one one embodiment, the cross-sections of the reflecting mirrors perpendicular to the main-scanning corresponding direction are in trapezoidal shapes. With this configuration, it is possible to avoid interference with other optical elements or walls of the optical housing, so that housing capability of the optical housing can be improved. The trapezoidal shape includes a triangle that is chamfered to prevent cracking.

Referring to FIGS. 16 to 19, explanation will be given of a relation between a distance Lpbs which is from the center of rotation of the optical deflector to the polarization separation surface of the polarization separation element and a distance Q which is between the axes of the photosensitive drums when a plurality of optical paths from the optical deflector to the surfaces of the photosensitive drums are set to be identical in a so-called opposite-placed scanning optical system. A typical opposite-placed scanning optical system is an optical system that performs scanning with light beams on both sides of the rotation axis of the optical deflector. In one embodiment, it is assumed that the scanning optical systems that scan the surfaces of the four photosensitive drums share a single optical deflector. In FIGS. 15 to 18, the scanning lens and the reflecting mirrors are omitted for convenience, and it is assumed that the reflecting mirrors are arranged at positions where the optical paths are folded. The optical paths are folded by the reflecting mirrors by a constant angle of 90° for simplicity. The folding directions of the last-stage reflecting mirrors are made opposite to those of one embodiment. The incidence angle on the surfaces of the photosensitive drums is assumed to be 0° because the incidence angle is not directly related to layout convenience.

Figure 16:
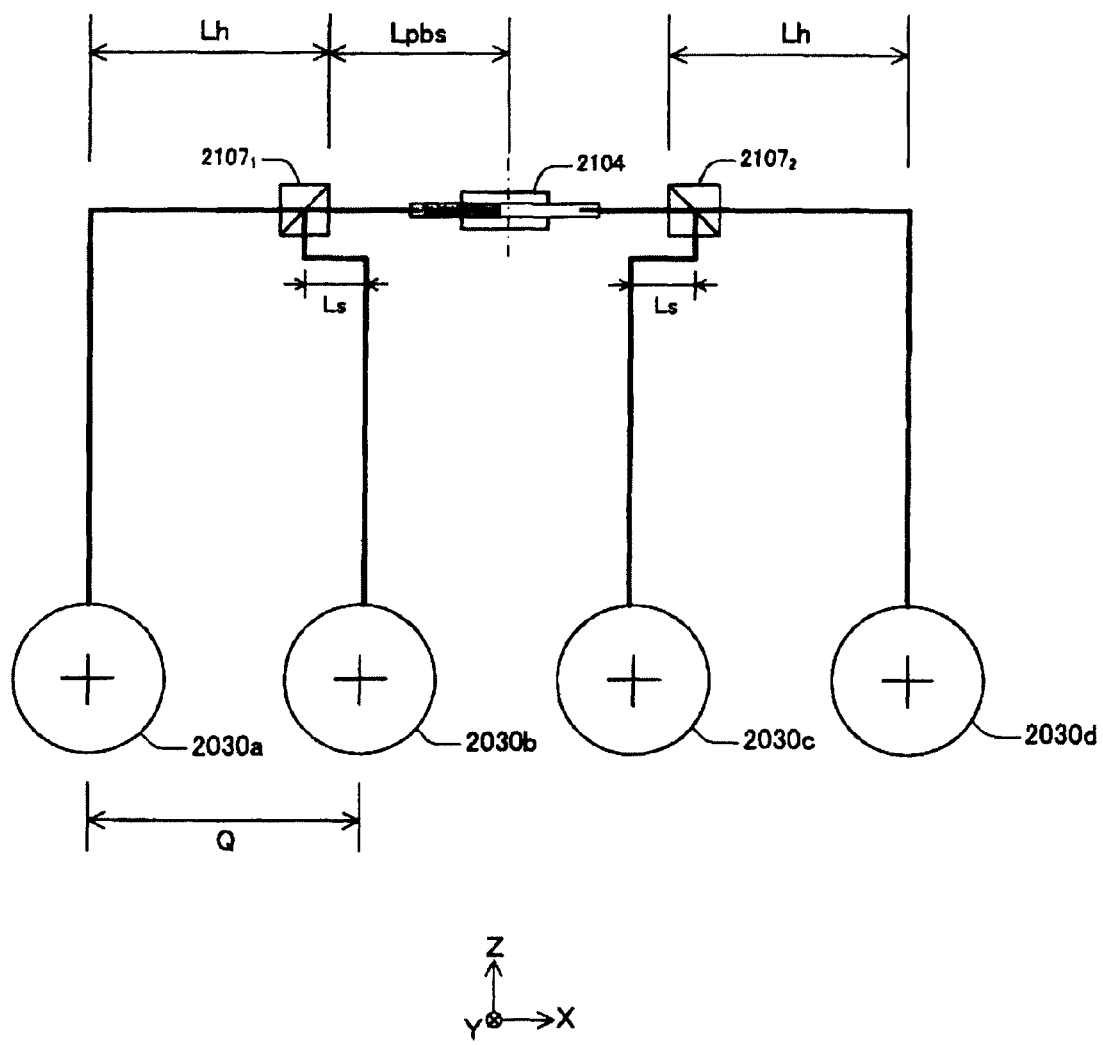
FIG. 16 is a diagram explaining a case where a distance from the center of rotation of a polygon mirror to a polarization separation surface of the polarization separation element is shorter than a distance between the axes of photosensitive drums.

As illustrated in FIG. 16, it is assumed that Ls represents a distance between the first reflecting mirror and the second reflecting mirror from the polarization separation element for light beams reflected by the polarization separation elements, and Lh represents a distance between the first reflecting mirror and the second reflecting mirror from the polarization separation elements for light beams transmitted through the polarization separation elements. In this case, to equalize the optical path lengths of light beams that travel toward the photosensitive drums 2030a and 2030d and the optical path lengths of the light beams that travel toward the photosensitive drums 2030b and 2030c, the optical path lengths of Lh need to be ensured within optical paths in front of the first reflecting mirrors from the polarization separation elements for the light beams that travel toward the photosensitive drums 2030b and 2030c.

1. When Lpbs<Q

Figure 17:
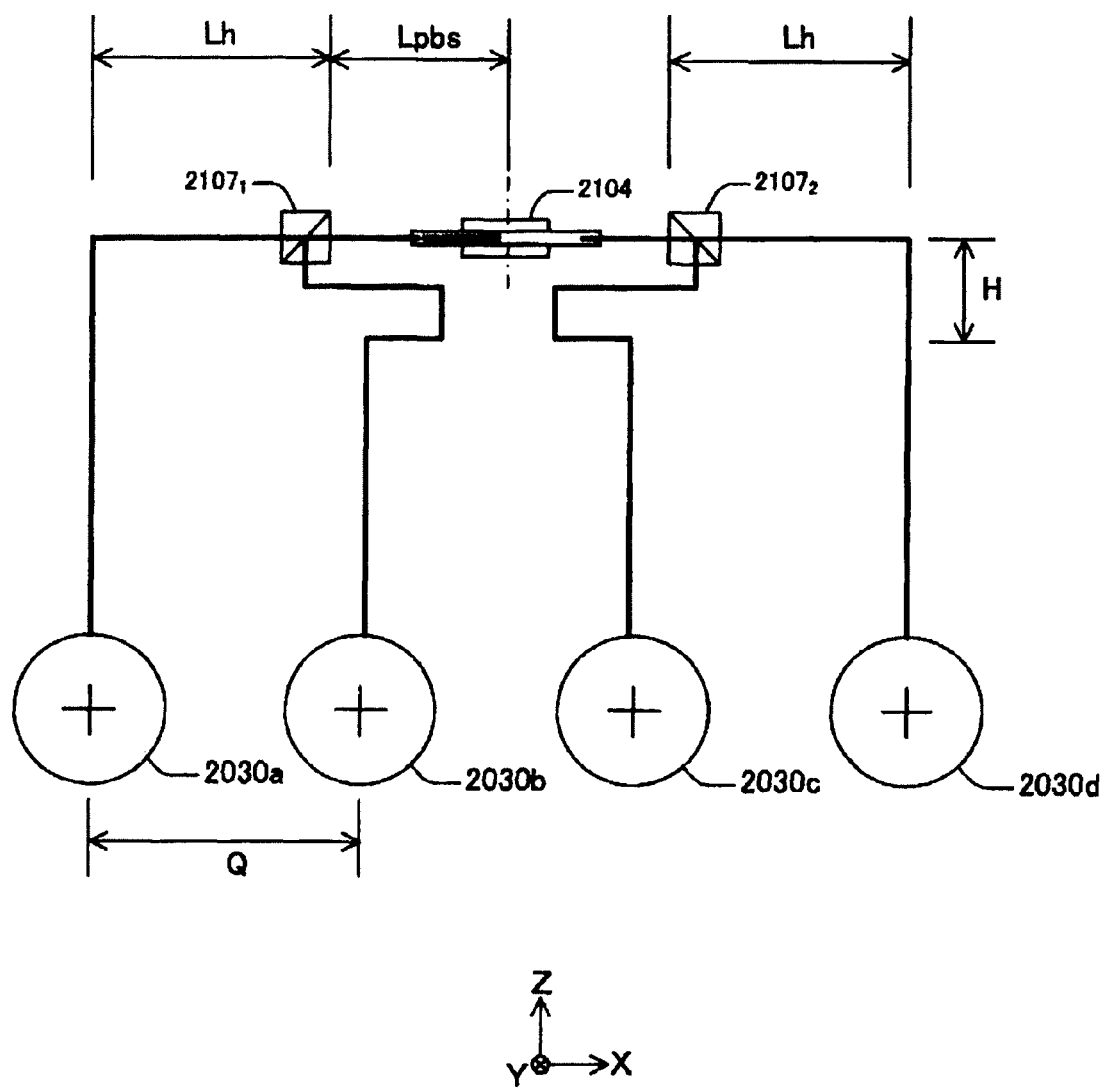
FIG. 17 is another diagram explaining the case where the distance from the center of rotation of the polygon mirror to the polarization separation surface of the polarization separation element is shorter than the distance between the axes of photosensitive drums.

When Lpbs<Q, because a distance between the polarization separation elements and the polygon mirror is short, Ls becomes short as a consequence. When Ls<Lh, as illustrated in FIG. 17 as an example, for the light beams that travel toward the photosensitive drums 2030b and 2030c, the number of reflecting mirrors on the optical paths of the light beams reflected by the polarization separation surfaces increases in order to ensure the optical path lengths for the light beams reflected by the polarization separation surfaces of the polarization separation elements. Therefore, the thickness H of the optical scanning device increases.

2 When Lpbs=Q

Figure 18:
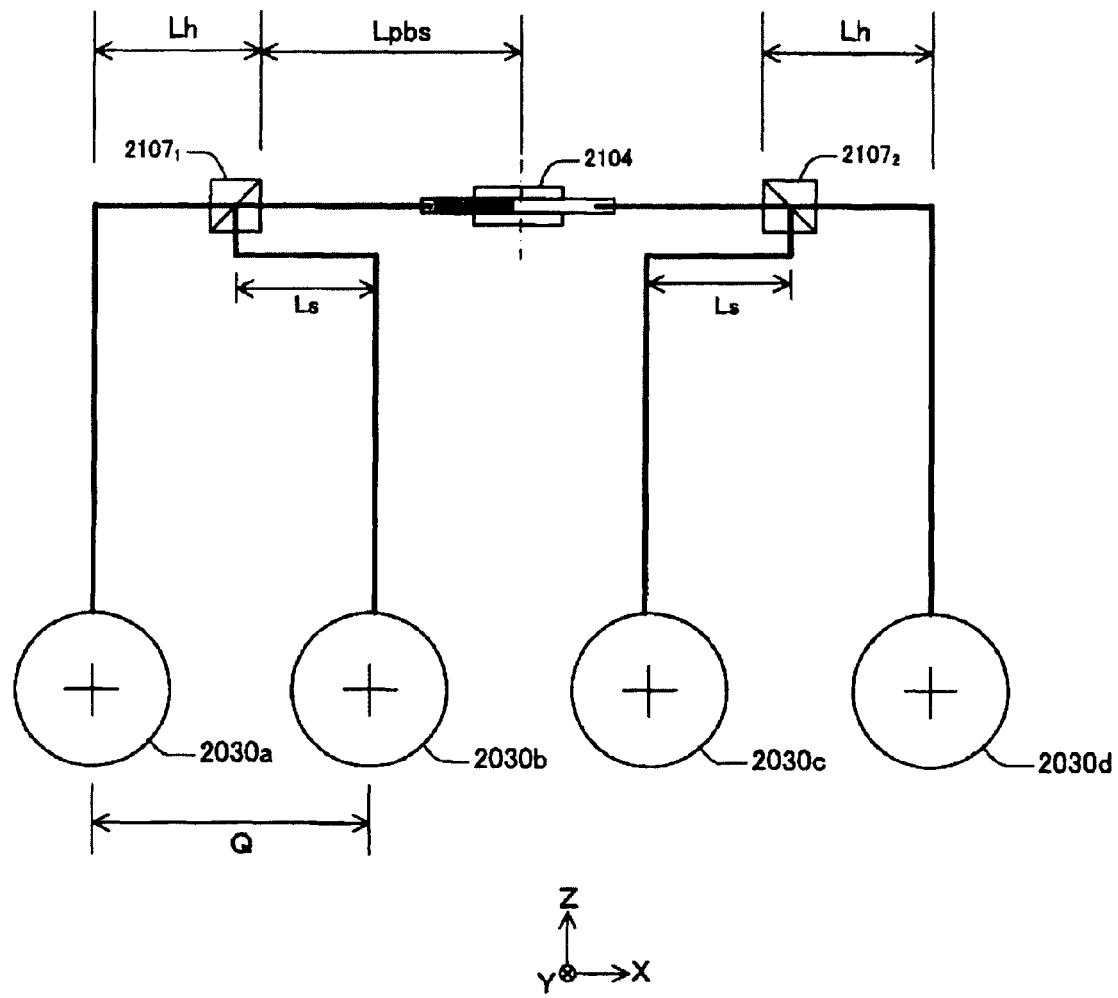
FIG. 18 is a diagram explaining a case where the distance from the center of rotation of the polygon mirror to the polarization separation surface of the polarization separation element is equal to the distance between the axes of photosensitive drums.

When Lpbs=Q, as illustrated in FIG. 18 as an example, such a relation that Lh<Lpbs is satisfied. Because Lh<Lpbs, it is not necessary to fold the optical paths a number of times as illustrated in FIG. 17. Therefore, the first reflecting mirror and the second reflecting mirror can be arranged between the light beam that has been deflected by the polygon mirror 2104 and the bottom plate of the optical housing 2300 in the Z-axis direction. Compared with the configuration of FIG. 17 (Lpbs<Q) in which the third reflecting mirror and the fourth reflecting mirror from the polarization separation elements are arranged on the optical paths of the light beams that have been reflected by the polarization separation elements, it is possible to ensure the optical path lengths of the light beams that have been reflected by the polarization separation surfaces without increase in the thickness H of the optical scanning device.

3 When Lpbs>Q

Figure 19:
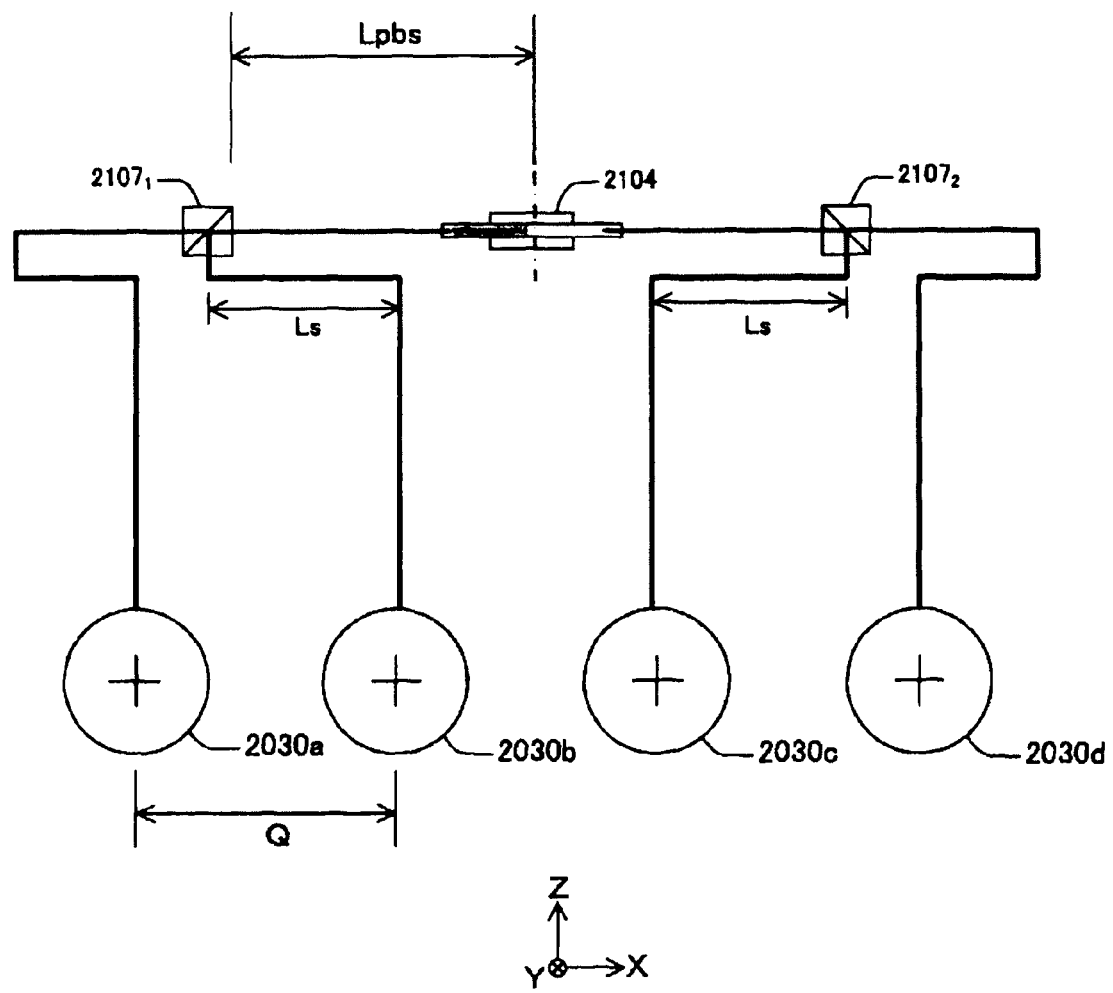
FIG. 19 is a diagram explaining a case where the distance from the center of rotation of the polygon mirror to the polarization separation surface of the polarization separation element is longer than the distance between the axes of photosensitive drums.

When Lpbs>Q, a distance between the polarization separation elements and the polygon mirror is long, so that there is a space for ensuring the optical path lengths of the light beams that have been reflected by the polarization separation surfaces. Therefore, compared with the configuration of FIG. 17 (Lpbs<Q), the number of the reflecting mirrors and the number of foldings of the optical paths can be reduced. As for the light beams that have transmitted through the polarization separation surfaces, the optical path lengths can be ensured by extending the optical paths in the X-axis direction as illustrated in FIG. 19. Therefore, it is not necessary to increase the thickness H of the optical scanning device in the Z-axis direction. With this configuration, the flexibility in the layout design can be increased without increase in the thickness H of the optical scanning device.

In this case, because a distance from the optical deflector to the polarization separation elements increases, the flexibility in relation to the arrangement positions of the deflector-side scanning lenses and the image-plane-side scanning lenses can be increased, which is desirable in terms of aberration correction.

As illustrated in FIG. 20, according to one embodiment, assuming that, in the X-axis direction, Lpbs1 is a distance from the center of rotation of the polygon mirror 2104 to the polarization separation surface of the polarization separation element $2107_1$, Lpbs2 is a distance from the center of rotation of the polygon mirror 2104 to the polarization separation surface of the polarization separation element $2107_2$, Q1 is an interval between the imaging positions on the photosensitive drums 2030a and 2030b, and Q2 is an interval between the imaging positions on the photosensitive drums 2030c and 2030d, such two relations that Lpbs1>Q1 and Lpbs2>Q2 are satisfied. Therefore, the flexibility in the layout design can be increased. In one embodiment, Q1=Q2=P.

FIG. 21 illustrates an example of design values of the scanning optical system according to one embodiment. Ry is a paraxial curvature radius in the main-scanning corresponding direction, and Rz(0) is a paraxial curvature radius in the sub-scanning corresponding direction. The center of rotation of the polygon mirror 2104 is assumed such that X=0 and Y=0, and the position of the optical path of the light beam that has been reflected by the reflecting surface of the polygon mirror 2104 in the Z-axis direction is assumed such that Z=0. The length of the write width on each photosensitive drum (valid scanning area) is 323 mm.

The emission-side surface of each deflector-side scanning lens is located at a position of about 39.77 mm in distance from the center of rotation of the polygon mirror 2104. Because L is obtained such that 39.77×2=79.54 mm, if the distance between the axes of the photosensitive drums 2030b and 2030c or the interval P between the imaging positions is equal to or greater than 90 mm, such a relation that P>L, can be satisfied.

The shape of the cross-section of the optical surface of each image-plane-side scanning lens perpendicular to the Z-axis direction (main-scanning cross section) is represented by the following Equation (1), and the shape of the cross-section perpendicular to the Y-axis direction becomes a free curved surface represented by the following Equation (2).

$$x = \frac{y^2 \cdot Cm}{1 + \sqrt{1 - (1+K) \cdot (y \cdot Cm)^2}} + A_1 \cdot y + A_2 \cdot y^2 + A_3 \cdot y^3 + A_4 \cdot y^4 + A_5 \cdot y^5 + A_6 \cdot y^6 + \ldots \quad (1)$$

$$C(y) = \frac{1}{Rz(0)} + B_1 \cdot y + B_2 \cdot y^2 + B_3 \cdot y^3 + B_4 \cdot y^4 + B_5 \cdot y^5 + B_6 \cdot y^6 + \ldots \quad (2)$$

In the above Equations (1) and (2), y is a distance from the optical axis in the main-scanning corresponding direction, K is a conical constant, and A1, A2, A3, A4, A5, A6, . . . are high-order coefficients. Furthermore, Cm=1/Ry. When at least one of odd-order coefficients (A1, A3, A5, . . . ) is not 0, an asymmetric shape with respect to the main-scanning corresponding direction is obtained.

R0 in the above Equation (2) is a curvature radius on the optical axis in the cross-section in the sub-scanning direction. B1, B2, B3, B4, B5, B6, . . . are high-order coefficients. When at least one of odd-order coefficients (B1, B3, B5, ...) are not 0, the curvature radius is asymmetrically changed with respect to the sub-scanning corresponding direction. When all of the high-order coefficients B1, B2, B3, B4, B5, B6, ... are 0, a surface with a constant curvature is obtained. Examples of the values of K and the high-order coefficients are illustrated in FIG. 22. An expression for a free curved surface is not limited to the above.

As described above, the optical scanning device 2010 of one embodiment includes the four light sources (2200a, 2200b, 2200c, and 2200d), the pre-deflector optical system, the polygon mirror 2104, the two deflector-side scanning lenses ($2105_1$ and $2105_2$), the two image-plane-side scanning lenses ($2106_1$ and $2106_2$), the two polarization separation elements ($2107_1$ and $2107_2$), and the eight reflecting mirrors (2108a, 2108b, 2108c, 2108d, 2109a, 2109b, 2109c, and 2109d).

The optical scanning device 2010 is arranged on the negative Z side of the four photosensitive drums (2030a, 2030b, 2030c, and 2030d). The last-stage reflecting mirrors (2109a and 2109b) are arranged on the negative Z side of the polygon mirror 2104 in the Z-axis direction and on the negative X side of the motor mechanism that drives the polygon mirror 2104. The last-stage reflecting mirrors (2109c and 2109d) are arranged on the negative Z side of the polygon mirror 2104 in the Z-axis direction and on the positive X side of the motor mechanism that drives the polygon mirror 2104.

With this configuration, it is possible to efficiently use a space on each of the positive and negative X sides of the motor mechanism that rotates the polygon mirror. Furthermore, it is possible to realize what is called a cross layout.

Furthermore, it is possible to arrange the scanning lens system near the polygon mirror, so that it becomes possible to reduce increase in costs even when the deflector-side scanning lens is made of glass. Therefore, it is not necessary to take into account the birefringence of the deflector-side scanning lens.

In the pre-deflector optical system, the optical system related to the light beams LBa and LBb (the first pre-deflector optical system) and the optical system related to the light beams LBc and LEd (the second pre-deflector optical system) are arranged so as to be symmetric with respect to a line that passes through the center of rotation of the polygon mirror 2104 and that is parallel to the Y-axis direction. The optical path of each light beam (the light beams LBa, LBb, LBc, and LBd) emitted from the pre-deflector optical systems is parallel to the Y-axis direction. With this configuration, it is possible to closely arrange the pre-deflector optical systems in the X-axis direction and prevent interference with the optical paths that are folded for downsizing and that are located subsequent to the scanning optical systems in the plane perpendicular to the Z-axis direction.

Figure 23:
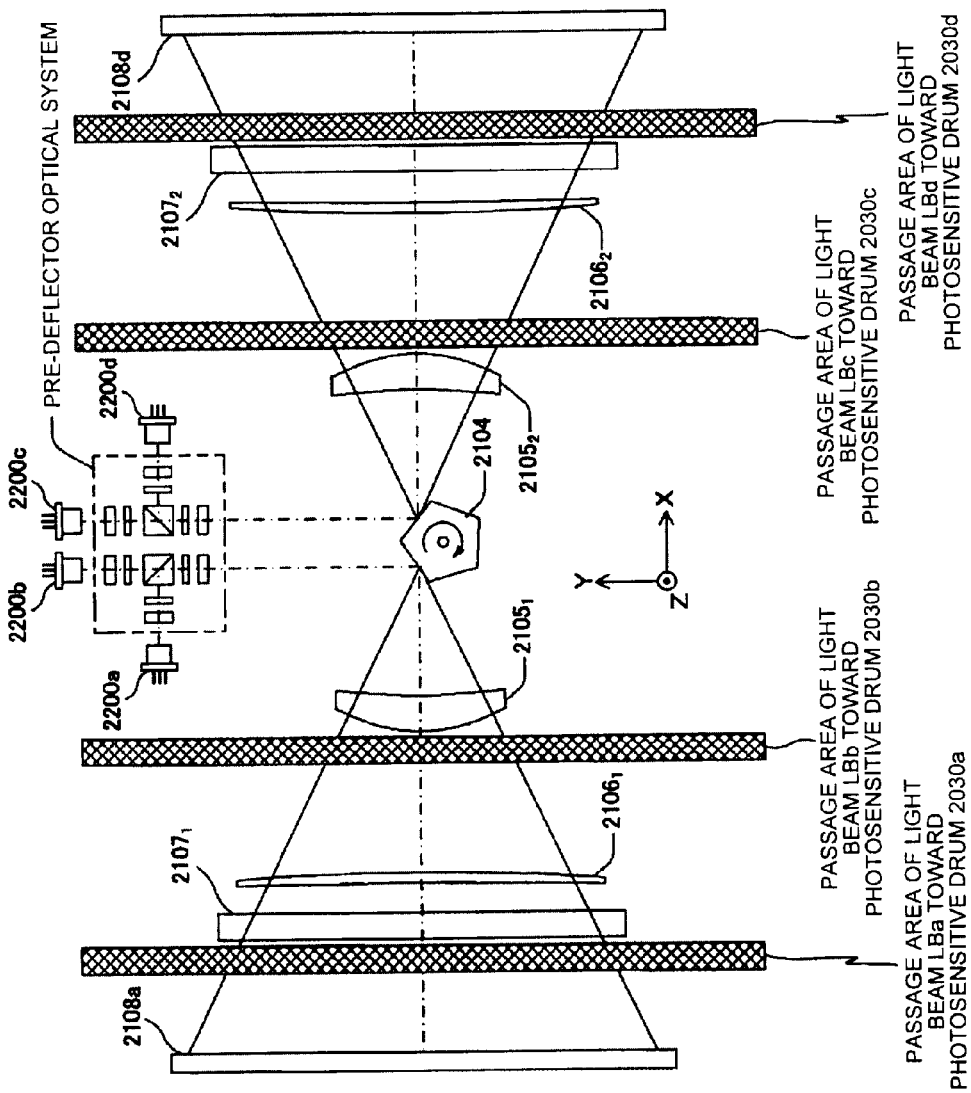
FIG. 23 is a diagram explaining areas through which light beams reflected by last-stage reflecting mirrors pass toward photosensitive drums.

More specifically, as illustrated in FIG. 23 as an example, areas through which the light beams that travel from the last-stage reflecting mirrors toward the photosensitive drums pass can be ensured without interference with the pre-deflector optical systems and the scanning lens systems. Furthermore, it is possible to avoid interference between the last-stage reflecting mirrors (2109b and 2109c) and the deflector-side scanning lenses.

Therefore, it is possible to make the device thin without reduction in the scanning accuracy and increase in costs.

Furthermore, according to one embodiment, it is possible to realize an optical scanning device of high quality without increasing the number of components. Therefore, it is not necessary to increase the usage of materials related to production of the optical scanning device. As a result, it is possible to suppress increase in environmental burden in relation to the output amount of resources and the discharge amount of resin refuse.

The color printer 2000 of one embodiment includes the optical scanning device 2010. Therefore, it is possible to downsize the color printer 2000 without increasing costs.

In general, an image forming unit for performing development, charging, cleaning of the photosensitive drum, discharging of toner, and storage of toner for each color is housed in a space between the photosensitive drum and the optical scanning device. Therefore, if the optical scanning device can be made thinner while the size of an image forming apparatus itself is maintained the same, a space available for the image forming unit can be increased inside the image forming apparatus. Consequently, it is possible to increase a portion for storing toner, enabling to reduce the number of supplies of toner by a user compared with the conventional technology. As a result, it is possible to increase the size of the photosensitive drum that is repeatedly subjected to operations such as exposure, development, and cleaning, making it possible to improve endurance. In this manner, by making the optical scanning device thinner, it is possible to allow a user to be free from frequent maintenance and frequent toner supply. Therefore, it is possible to achieve improvement in usability.

Figure 24:
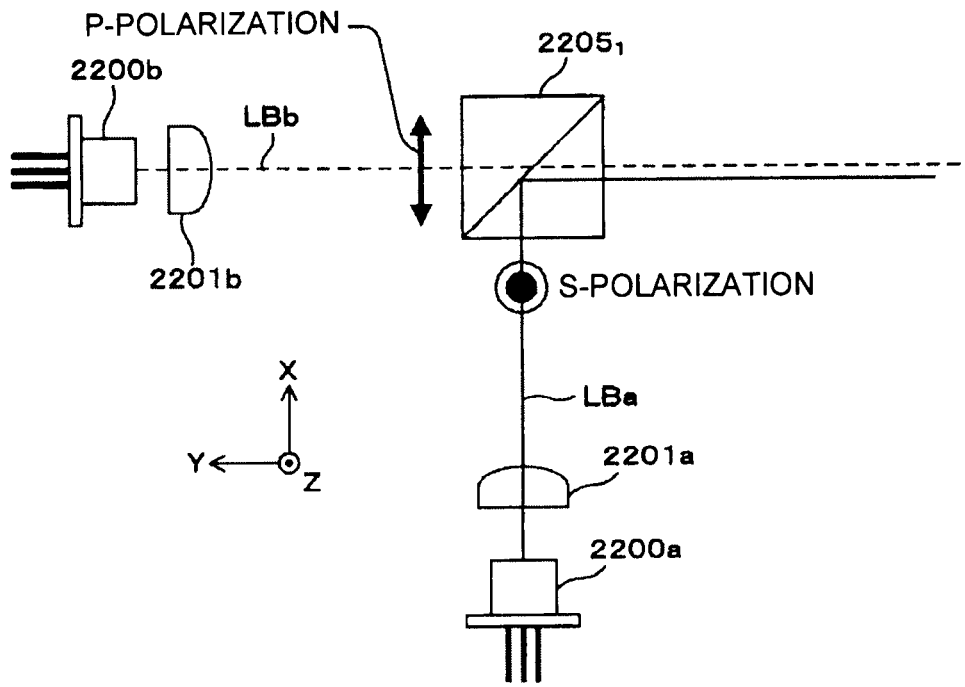
FIG. 24 is a diagram explaining a pre-deflector optical system according to a first modification.
Figure 25:
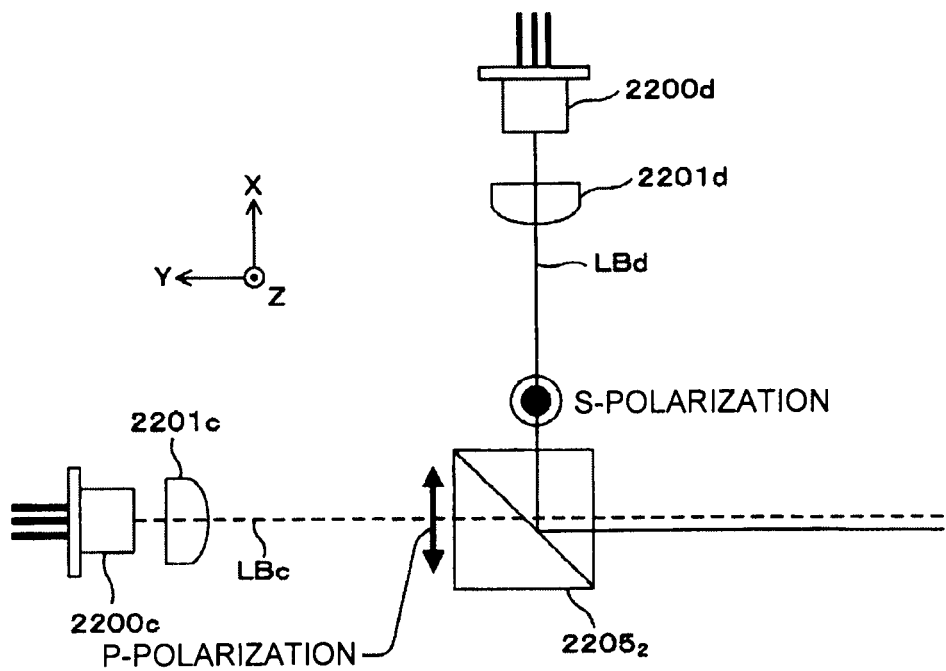
FIG. 25 is another diagram explaining the pre-deflector optical system according to the first modification.
Figure 26:
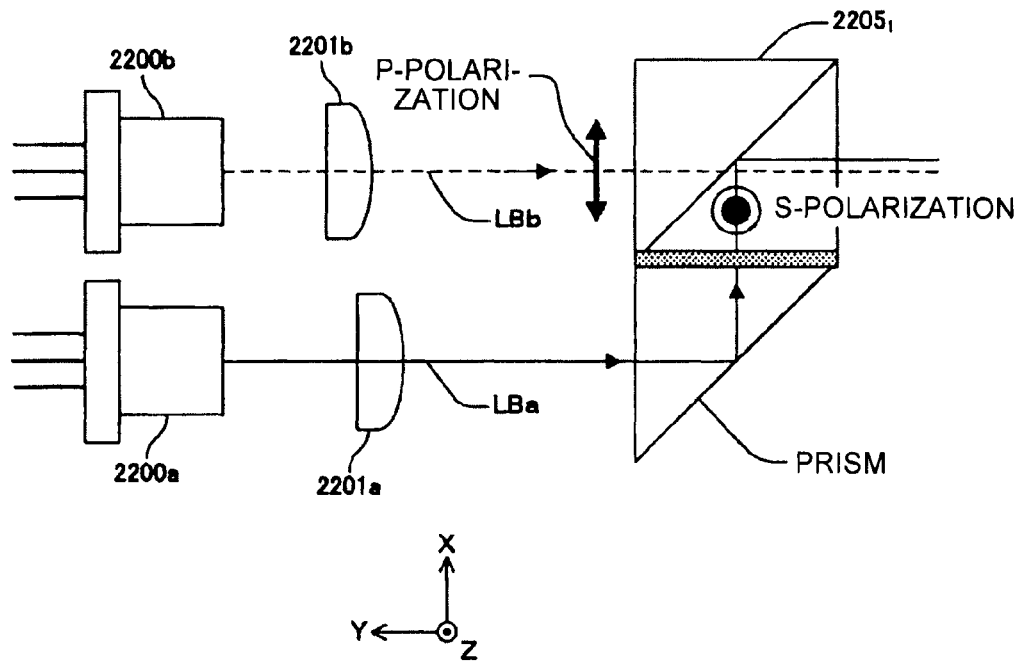
FIG. 26 is a diagram explaining a pre-deflector optical system according to a second modification.
Figure 27:
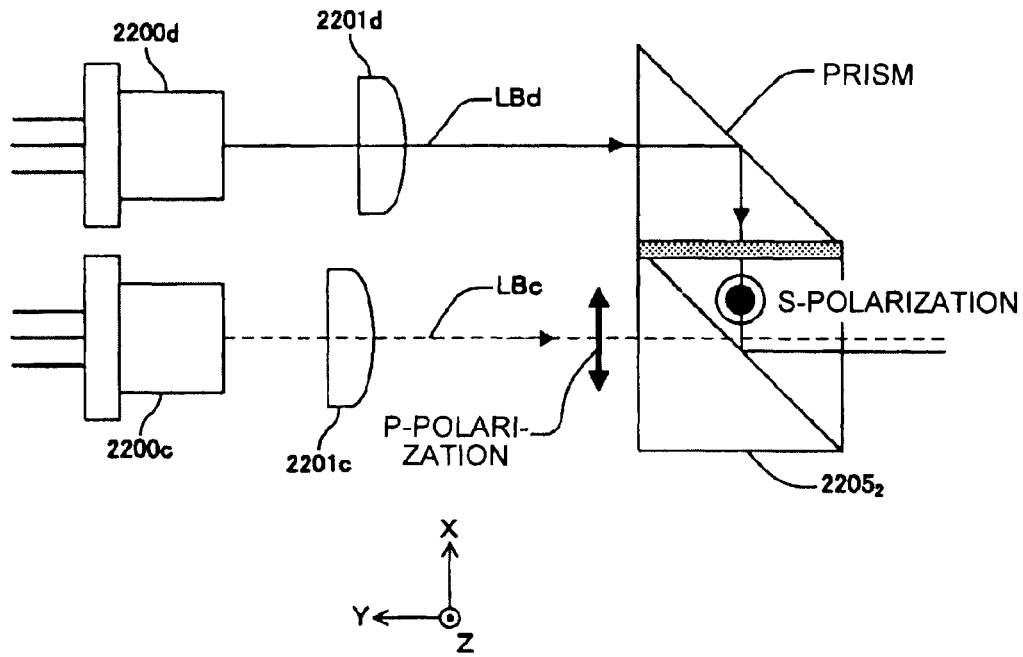
FIG. 27 is another diagram explaining the pre-deflector optical system according to the second modification.
Figure 28:
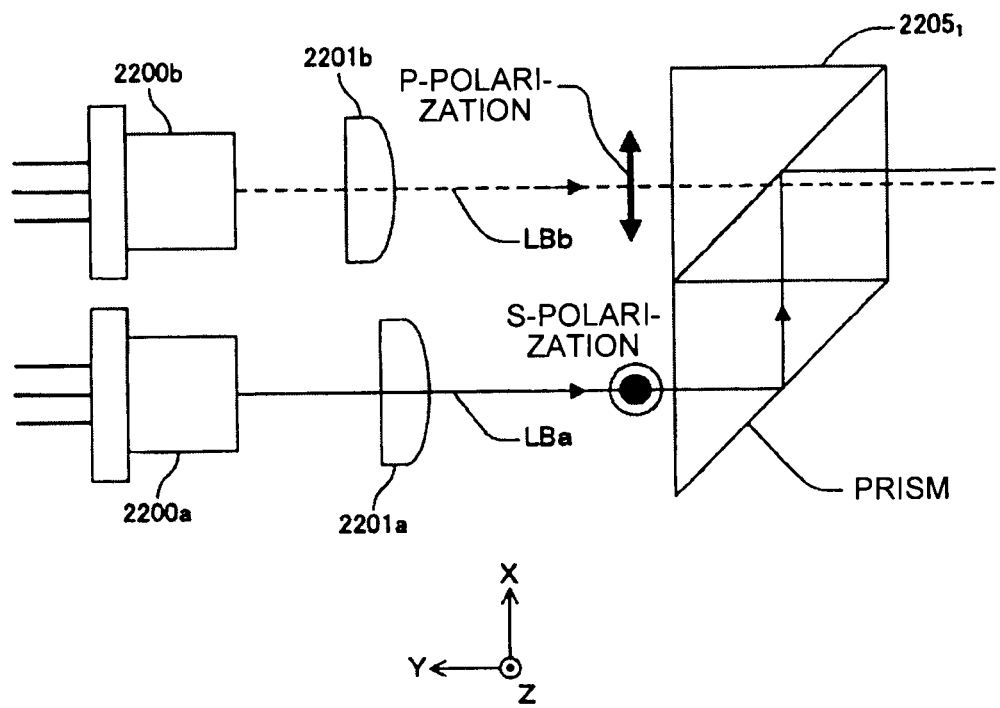
FIG. 28 is a diagram explaining a pre-deflector optical system according to a third modification.
Figure 29:
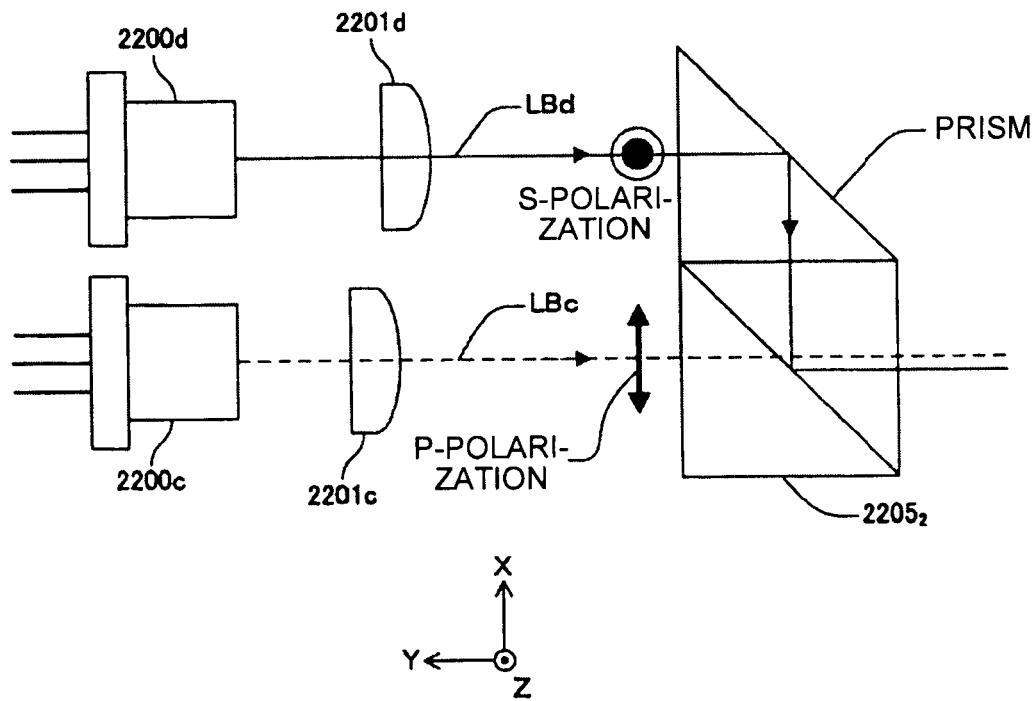
FIG. 29 is another diagram explaining the pre-deflector optical system according to the third modification.

In the above embodiment, as illustrated in FIG. 24 as an example, when a light beam emitted by a light source 2200a is an s-polarized beam with respect to the beam synthesizing element $2205_1$ and a light beam emitted by a light source 2200b is a p-polarized beam with respect to the beam synthesizing element $2205_1$, the half-wave plates (2202a and 2202b) are not needed. Similarly, as illustrated in FIG. 25 as an example, when a light beam emitted by a light source 2200c is a p-polarized beam with respect to the beam synthesizing element $2205_2$ and a light beam emitted by a light source 2200d is an s-polarized beam with respect to the beam synthesizing element $2205_2$, the half-wave plates (2202c and 2202d) are not needed.

In the above embodiment, as illustrated in FIGS. 26 to 29 as an example, it is possible to arrange the light sources parallel to each other by using a prism.

While the diffractive surface of the diffraction lens is in the multi-step shape in one embodiment, the present invention is not limited to this example. In this regard, however, when the diffractive surface is in a Fresnel lens shape, difficult processing and molding are required.

In the above embodiment, it is possible to use an optical deflector with a galvanometer mirror or a micromirror instead of the polygon mirror 2104.

While each light source has an edge emitting element as a light-emitting element in one embodiment, the present invention is not limited to this example. It is possible to use a vertical-cavity surface emitting laser (VCSEL).

While each light source has two light-emitting units in one embodiment, the present invention is not limited to this example. Each light source may have one light-emitting unit or three or more light-emitting units.

In the above embodiment, it is possible to use, instead of the beam synthesizing element $2205_1$, a spatial light modulator that can switch and select one of the light beams LBa and LBb at predetermined intervals as a light beam that travels toward the aperture plate $2203_1$. Similarly, it is possible to use, instead of the beam synthesizing element $2205_2$, a spatial light modulator that can switch and select one of the light beams LBc and LBd at predetermined intervals as a light beam that travels toward the aperture plate $2203_2$.

Figure 30:
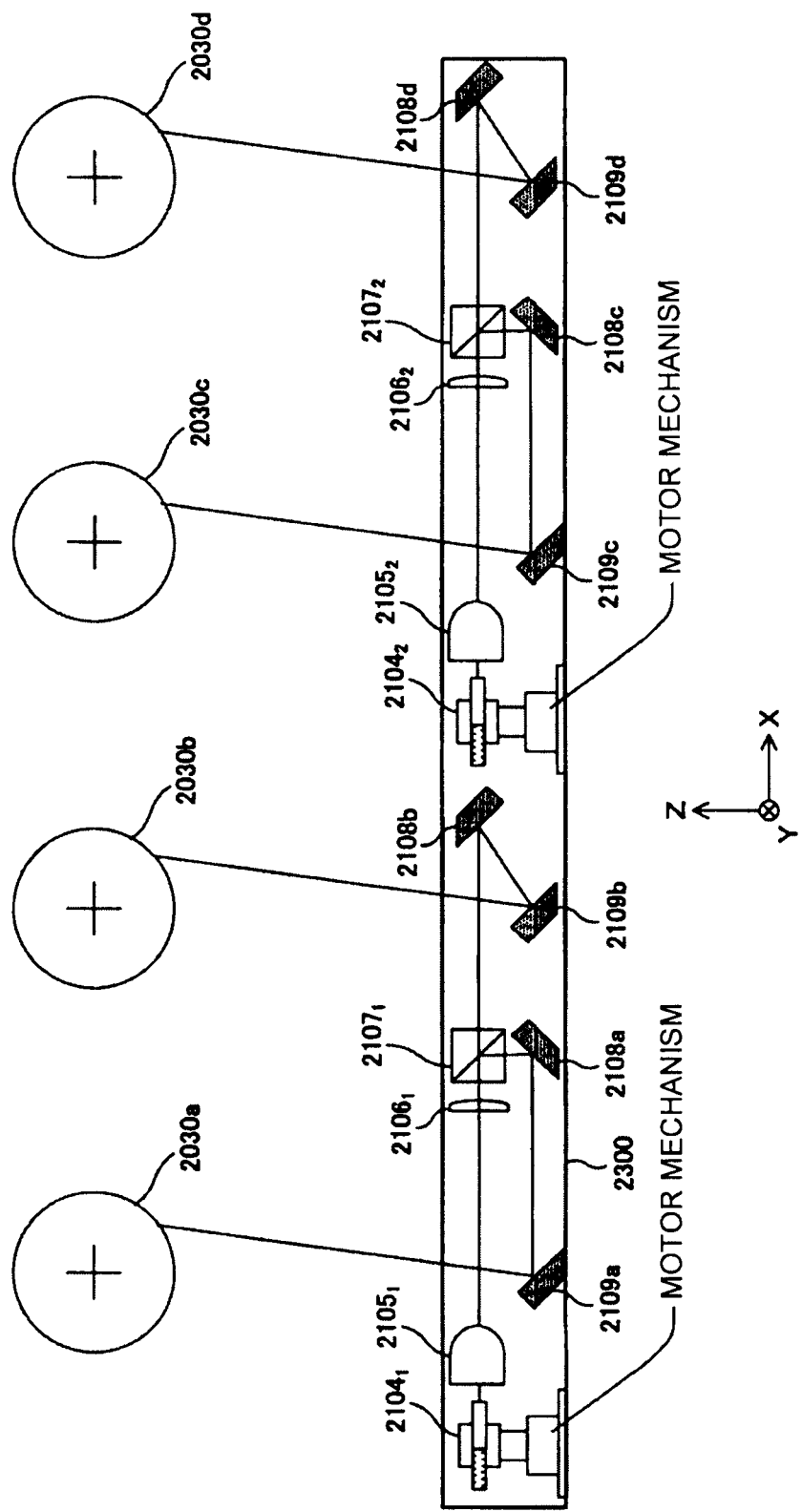
FIG. 30 is a diagram explaining an optical scanning device according to a modification.

In one embodiment, the optical scanning device is a so-called opposite-placed scanning type optical scanning device, in which the scanning optical systems are arranged on both sides of the polygon mirror 2104. However, the present invention is not limited to this example. As illustrated in FIG. 30 as an example, the optical scanning device may be of a type that includes a polygon mirror $2104_1$ for deflecting the light beams LBa and LBb and a polygon mirror $2104_2$ for deflecting the light beams LBc and LBd for performing scanning in one direction.

Figure 31:
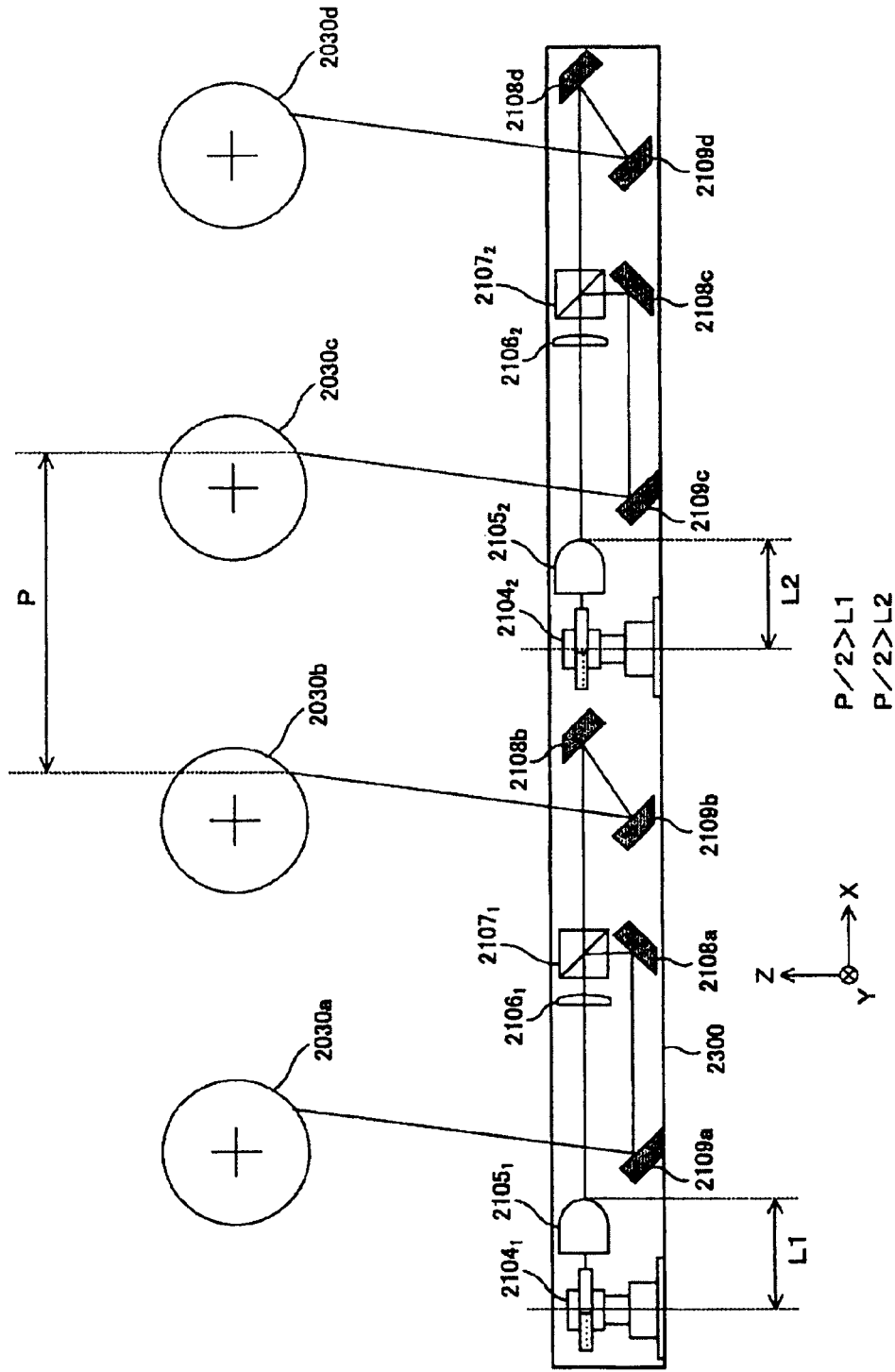
FIG. 31 is another diagram explaining the optical scanning device according to the modification.
Figure 32:
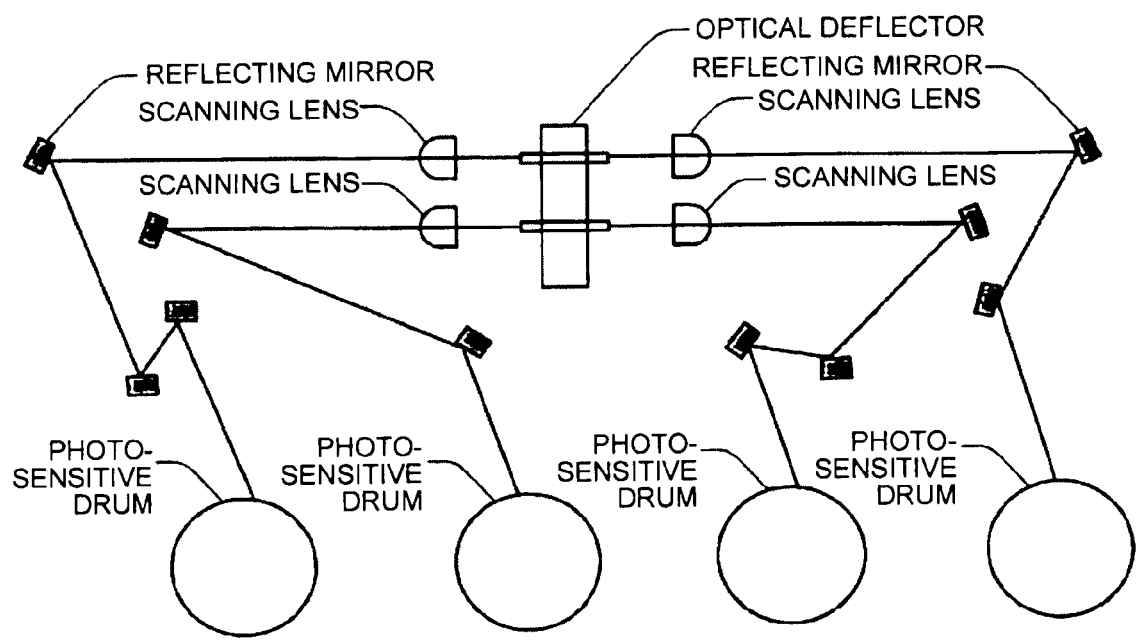
FIG. 32 is a diagram explaining an example of a conventional optical scanning device.

In this case, as illustrated in FIG. 31 as an example, a distance L1 between the center of rotation of the polygon mirror $2104_1$ and the emission-side surface of the deflector-side scanning lens $2105_1$ is preferably smaller than P/2 in the X-axis direction. Furthermore, a distance L2 between the center of rotation of the polygon mirror $2104_2$ and the emission-side surface of the deflector-side scanning lens $2105_2$ is preferably smaller than P/2 in the X-axis direction.

While the image forming apparatus includes the four photosensitive drums in one embodiment, the present invention is not limited to this example. For example, the image forming apparatus may include two photosensitive drums, or five or six photosensitive drums.

In the above embodiment, it is possible to employ a direct transfer system in which a toner image is directly transferred from a photosensitive drum to a recording sheet.

While the image carrier is in a drum shape in one embodiment, the present invention is not limited to this example. The image carrier may be a sheet type or a belt type. For example, a zinc oxide sheet may be used as a sheet-type optically conductive photosensitive element.

While the image forming apparatus is the color printer 2000 in one embodiment, the present invention is not limited to this example. For example, the image forming apparatus may be an optical plotter or a digital copier.

The present invention may be applied to an image forming apparatus that uses a silver-halide film as the image carrier. In this case, a latent image is formed on the silver-halide film by optical scanning, and the latent image can be visualized by a process similar to a developing process in a normal silver-halide photography process. Furthermore, the image can be transferred onto a printing sheet that is a transfer object by a process similar to a printing process in the normal silver-halide photography process. An image forming apparatus and an optical platemaking device as described above can be configured as a photolithography device that draws a CT scan image or the like.

The present invention may also be applied to an image forming apparatus that includes, as the image carrier, a coloring medium (positive printing sheet) that forms color with the aid of thermal energy from a beam spot. In this case, it is possible to directly form a visualized image on the image carrier by optical scanning.

That is, any image forming apparatus that includes the optical scanning device 2010 can be downsized without increase in costs.

As described above, according to the optical scanning device of the present invention, it is possible to downsize the optical scanning device without increase in costs while maintaining high accuracy in optical scanning. Furthermore, according to the image forming apparatus of the present invention, it is possible to downsize the apparatus without increase in costs and while maintaining high image quality.

According to one aspect of the present invention, it is possible to realize downsizing without increase in costs and while maintaining high accuracy in optical scanning.

Furthermore, according to another aspect of the present invention, an image forming apparatus includes a plurality of image carriers and the optical scanning device of the present invention that performs optical scanning on the image carriers with beams modulated based on image information.

Therefore, with the optical scanning device of the present invention, it is possible to downsize the image forming apparatus without increase in costs and while maintaining high image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
    an illuminating system that emits a plurality of beams including a first beam and a second beam;
    an optical deflector that deflects the beams from the illuminating system; and
    a scanning optical system that includes
        a polarization separation element that
            transmits one of the first beam and the second beam that are deflected by the optical deflector, and
            reflects another one of the first beam and the second beam that are deflected by the optical deflector;
        a first mirror group including a plurality of reflecting mirrors for guiding the first beam, which comes from the polarization separation element, to a corresponding to-be-scanned member; and
        a second mirror group including a plurality of reflecting mirrors for guiding the second beam, which comes from the polarization separation element, to a corresponding to-be-scanned member, wherein
    at least two of the to-be-scanned members are arranged in a first direction orthogonal to a second direction, the second direction is defined as a direction
        parallel to an axis direction about which the optical deflector rotates, and
        directed from a plane defined by the beams deflected by the optical deflector to a driving mechanism provided for driving the optical deflector,
    a last-stage reflecting mirror in the first mirror group and a last-stage reflecting mirror in the second mirror group are provided at one side over the plane in the second direction,
    the first beam is reflected, by the last-stage reflecting mirror in the first mirror group, in a reverse direction of the second direction over the plane,
    the second beam is reflected, by the last-stage reflecting mirror in the second mirror group, in the reverse direction of the second direction over the plane,
    the at least two to-be-scanned members include four to-be-scanned members, the light beams further includes a third beam and a fourth beam whose polarization directions are different from each other, the polarization separation element is arranged on one side of the optical deflector in the first direction and functions as a first polarization separation element, the scanning optical system further includes a second polarization separation element that is arranged on the other side of the optical deflector in the first direction, transmits one of the third beam and the fourth beam that are deflected by the optical deflector, and reflects the other one of the third beam and the fourth beam that are deflected by the optical deflector; a third mirror group including a plurality of reflecting mirrors for guiding the third beam, which comes from the second polarization separation element, to a corresponding to-be-scanned member; and a fourth mirror group including a plurality of reflecting mirrors for guiding the fourth beam, which comes from the second polarization separation element, to a corresponding to-be-scanned member, wherein a last-stage reflecting mirror in the third mirror group and a last-stage reflecting mirror in the fourth mirror group are provided at the one side over the plane in the second direction, the scanning optical system further includes a first scanning lens system that is arranged on an optical path between the optical deflector and the first polarization separation element; and a second scanning lens system that is arranged on an optical path between the optical deflector and the second polarization separation element, the first scanning lens system includes a first deflector-side scanning lens and a first image-plane-side scanning lens, the second scanning lens system includes a second deflector-side scanning lens and a second image-plane-side scanning lens, the first deflector-side scanning lens is arranged on an optical path of the first scanning lens system such that it is closest to the optical deflector in the first scanning lens system and is made of glass, the first image-plane-side scanning lens is arranged on the optical path of the first scanning lens system such that it is opposite to the first deflector-side scanning lens and is made of resin, the second deflector-side scanning lens is arranged on an optical path of the second scanning lens system such that it is closest to the optical deflector in the second scanning lens system and is made of glass, the second image-plane-side scanning lens is arranged on the optical path of the second scanning lens system such that it is opposite to the second deflector-side scanning lens and is made of resin, wherein P>L, where P is a distance between imaging positions of central two to-be-scanned members among the four to-be-scanned members in the first direction, and L is a distance between an emission surface of the first deflector-side scanning lens and an emission surface of the second deflector-side scanning lens, and wherein the distance between the first deflector-side scanning lens and the first image-plane-side scanning lens in the first direction is greater than the distance between the optical deflector and the first deflector-side scanning lens.

2. The optical scanning device according to claim 1, wherein the polarization separation element reflects one of the first beam and the second beam to one side in the second direction.

3. The optical scanning device according to claim 1, wherein the optical deflector includes a rotation axis parallel to the second direction, and includes a plurality of reflecting surfaces that are rotatable about the rotation axis, and a distance between the rotation axis and the polarization separation element in the first direction is longer than a distance between the to-be-scanned member corresponding to the first beam and the to-be-scanned member corresponding to the second beam in the first direction.

4. The optical scanning device according to claim 1, wherein each of the reflecting mirrors in the first mirror group and in the second mirror group has a cross-section in a trapezoidal shape, the cross-section being perpendicular to a main-scanning direction which is orthogonal to the first direction and the second direction.

5. The optical scanning device according to claim 1, wherein the beams emitted from the illuminating system are substantially parallel to one another.

6. An image forming apparatus comprising:
a plurality of image carriers; and
the optical scanning device according to claim 1, the optical scanning device configured to optically scan the image carriers with a beam modulated based on image information.

7. The image forming apparatus according to claim 6, wherein in the optical scanning device, the polarization separation element reflects one of the first beam and the second beam to one side in the second direction.

8. The image forming apparatus according to claim 6, wherein in the optical scanning device, the optical deflector includes a rotation axis parallel to the second direction; and a plurality of reflecting surfaces that are rotatable about the rotation axis, and a distance between the rotation axis and the polarization separation element in the first direction is longer than a distance between the to-be-scanned member corresponding to the first beam and the to-be-scanned member corresponding to the second beam in the first direction.

9. The optical scanning device according to claim 1, wherein the distance between the second deflector-side scanning lens and the second image-plane-side scanning lens in the first direction is greater than the distance between the optical deflector and the second deflector-side scanning lens.

* * * * *